United States Patent
Sharma et al.

(10) Patent No.: US 11,164,203 B2
(45) Date of Patent: Nov. 2, 2021

(54) METHODS AND SYSTEMS FOR DISBURSING LOYALTY POINTS

(71) Applicant: MASTERCARD INTERNATIONAL INCORPORATED, Purchase, NY (US)

(72) Inventors: Rajat Sharma, Gurgaon (IN); Shubhangi Sengar, Jabalpur (IN); Anurag Aggarwal, Gurgaon (IN); Aditya Koduri, Gurgaon (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/743,869

(22) Filed: Jan. 15, 2020

(65) Prior Publication Data

US 2021/0217043 A1 Jul. 15, 2021

(51) Int. Cl.
*G06Q 30/02* (2012.01)
(52) U.S. Cl.
CPC ..... *G06Q 30/0227* (2013.01); *G06Q 30/0202* (2013.01); *G06Q 30/0224* (2013.01)
(58) Field of Classification Search
CPC .................................................. G06Q 30/02
See application file for complete search history.

(56) References Cited

U.S. PATENT DOCUMENTS

| | | | | |
|---|---|---|---|---|
| 2005/0149394 A1* | 7/2005 | Postrel | ............... | G06Q 30/0224 705/14.25 |
| 2005/0267800 A1* | 12/2005 | Tietzen | ............... | G06Q 30/0211 705/14.13 |
| 2009/0159707 A1* | 6/2009 | Mullen | ............... | G06K 19/0723 235/493 |
| 2012/0010937 A1* | 1/2012 | Hanson | ............... | G06Q 30/0207 705/14.27 |
| 2016/0071140 A1* | 3/2016 | Sherman | ............ | G06Q 30/0226 705/14.27 |
| 2016/0267517 A1* | 9/2016 | Zachrisen | .......... | G06Q 30/0233 |
| 2018/0047046 A1* | 2/2018 | Sharma | ............... | G06Q 30/0215 |

FOREIGN PATENT DOCUMENTS

| | | | | |
|---|---|---|---|---|
| WO | WO 2005033857 A2 | * | 4/2005 | |
| WO | WO 2012/103131 A2 | * | 8/2012 | ........... G06Q 20/405 |

OTHER PUBLICATIONS

Method and System for processing customized reward offers to e-commerce buyers, An IP.com Prior Art Database Technical Disclosure, Nov. 8, 2000 (Year: 2000).*

* cited by examiner

*Primary Examiner* — Marilyn G Macasiano
(74) *Attorney, Agent, or Firm* — Jordan IP Law, LLC

(57) ABSTRACT

A method and system for disbursing loyalty points is provided. A server receives loyalty points disbursement (LPD) parameters including at least an initial earn rate, a loyalty points budget, and a disbursement period. The server receives an LPD request corresponding to a transaction performed by a user. The server updates the initial earn rate based on at least one of real-time transaction data, predictive transaction data, real-time market disbursement data, and predictive market disbursement data. The server disburses a first set of loyalty points, from the loyalty points budget, to the user based on at least the updated earn rate and a transaction amount of the first transaction.

14 Claims, 11 Drawing Sheets

METHODS AND SYSTEMS FOR DISBURSING LOYALTY POINTS

FIELD

Various embodiments of the disclosure relate generally to loyalty programs. More particularly, various embodiments of the disclosure relate to methods and systems for disbursing loyalty points.

BACKGROUND

Currently, financial institutions provide loyalty programs to incentivize users to participate in certain purchase or transaction activities. The loyalty programs may include providing rebates or credit points, for certain types of transactions. For example, a credit card issuer may provide cash rebates, or equivalent points, when a user uses the corresponding credit card to purchase items from certain merchants in an online or offline manner. The user may use the cash rebates or points for future purchases. Generally, a financial institution such as a bank or merchant often purchases loyalty programs from a payment network (such as Mastercard®, Visa®, or the like) for rewarding its users. The bank or merchant typically sets a fixed budget with the payment network for a loyalty program. In one example of the loyalty program, each user is provided with a fixed amount of loyalty points for a fixed amount of dollars spent. Thus, an earn rate for a user (i.e., a count of loyalty points that are earned by a user per dollar spent) is fixed. As a consequence, the budget is set based on an estimation of transactions to be performed by the users during a period for which the budget is to be set. Due to such estimations, the bank or merchant may either overspend or underspend the budget. Overspending the budget may cause a financial loss to the bank or merchant. Further, underspending the budget is indicative of ignorance of the users in using transaction services offered by the bank or merchant. Thus, both overspending and underspending of the budget are disadvantageous for the bank or merchant.

Further, these loyalty programs are successful, as many users who participate in the loyalty programs indicate that their participation in the loyalty programs has an impact on their purchasing decisions. Unfortunately, the ubiquity of these loyalty programs has led to dilution of their impact. With so many programs, and so little differentiation, the users' behaviors are not directly driven by the loyalty programs. As a result, many users do not actively participate in many loyalty programs even after they have enrolled.

In light of the foregoing, there is a need for a technical solution that solves the abovementioned problems and provides a seamless mechanism for disbursing loyalty points to users such that a budget set for the loyalty points is efficiently utilized without overspending and also encouraging their participation in the loyalty programs.

SUMMARY

In an embodiment of the disclosure, a method for disbursing loyalty points is provided. The method includes receiving loyalty points disbursement (LPD) parameters by an LPD server from at least one of an issuer server and a merchant server. The LPD parameters include at least an initial earn rate, a loyalty points budget, and a disbursement period. The method further includes receiving a first LPD request corresponding to a first transaction performed by a first user. The first LPD request is received by the LPD server from a payment network server. The method further includes updating the initial earn rate by the LPD server. The initial earn rate is updated based on at least one of real-time transaction data, predictive transaction data, real-time market disbursement data, and predictive market disbursement data. The real-time transaction data includes real-time available budget data and real-time available disbursement period. The predictive transaction data includes an estimate of future transactions in one or more future time intervals. The real-time market disbursement data includes a real-time disbursement rate at which loyalty points are currently being disbursed by other issuers or merchants. The predictive market disbursement data includes a future disbursement rate at which loyalty points are likely to be disbursed by other issuers or merchants. The method further includes disbursing a first set of loyalty points to the first user. The first set of loyalty points is disbursed by the LPD server from the loyalty points budget. The first set of loyalty points is disbursed based on the updated earn rate and a transaction amount of the first transaction.

In another embodiment of the disclosure, a system for disbursing loyalty points is provided. The system includes a loyalty points disbursement (LPD) server that is configured to receive LPD parameters from at least one of an issuer server and a merchant server. The LPD parameters include at least an initial earn rate, a loyalty points budget, and a disbursement period. The LPD server is further configured to receive a first LPD request corresponding to a first transaction performed by a first user from a payment network server. The LPD server is further configured to update the initial earn rate based on at least one of real-time transaction data, predictive transaction data, real-time market disbursement data, and predictive market disbursement data. The real-time transaction data includes real-time available budget data and real-time available disbursement period. The predictive transaction data includes an estimate of future transactions in one or more future time intervals. The real-time market disbursement data includes a real-time disbursement rate at which loyalty points are currently being disbursed by other issuers or merchants. The predictive market disbursement data includes a future disbursement rate at which loyalty points are likely to be disbursed by other issuers or merchants. The LPD server is further configured to disburse a first set of loyalty points to the first user. The first set of loyalty points is disbursed from the loyalty points budget. The first set of loyalty points is disbursed based on the updated earn rate and a transaction amount of the first transaction.

In another embodiment of the disclosure, a method for disbursing loyalty points is provided. The method includes receiving a first transaction request for a first transaction by a server from a first user device of a first user. The method further includes updating an initial earn rate by the server upon receipt of a first LPD request corresponding to the first transaction. The initial earn rate is updated based on at least one of real-time transaction data, predictive transaction data, real-time market disbursement data, and predictive market disbursement data. The method further includes disbursing a first set of loyalty points to the first user. The first set of loyalty points is disbursed by the server from the loyalty points budget. The first set of loyalty points is disbursed based on the updated earn rate and a transaction amount of the first transaction.

BRIEF DESCRIPTION OF THE DRAWINGS

The accompanying drawings illustrate the various embodiments of systems, methods, and other aspects of the disclosure. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the disclosure are illustrated by way of example, and not limited by the appended figures, in which like references indicate similar elements, and in which.

Figure 1:
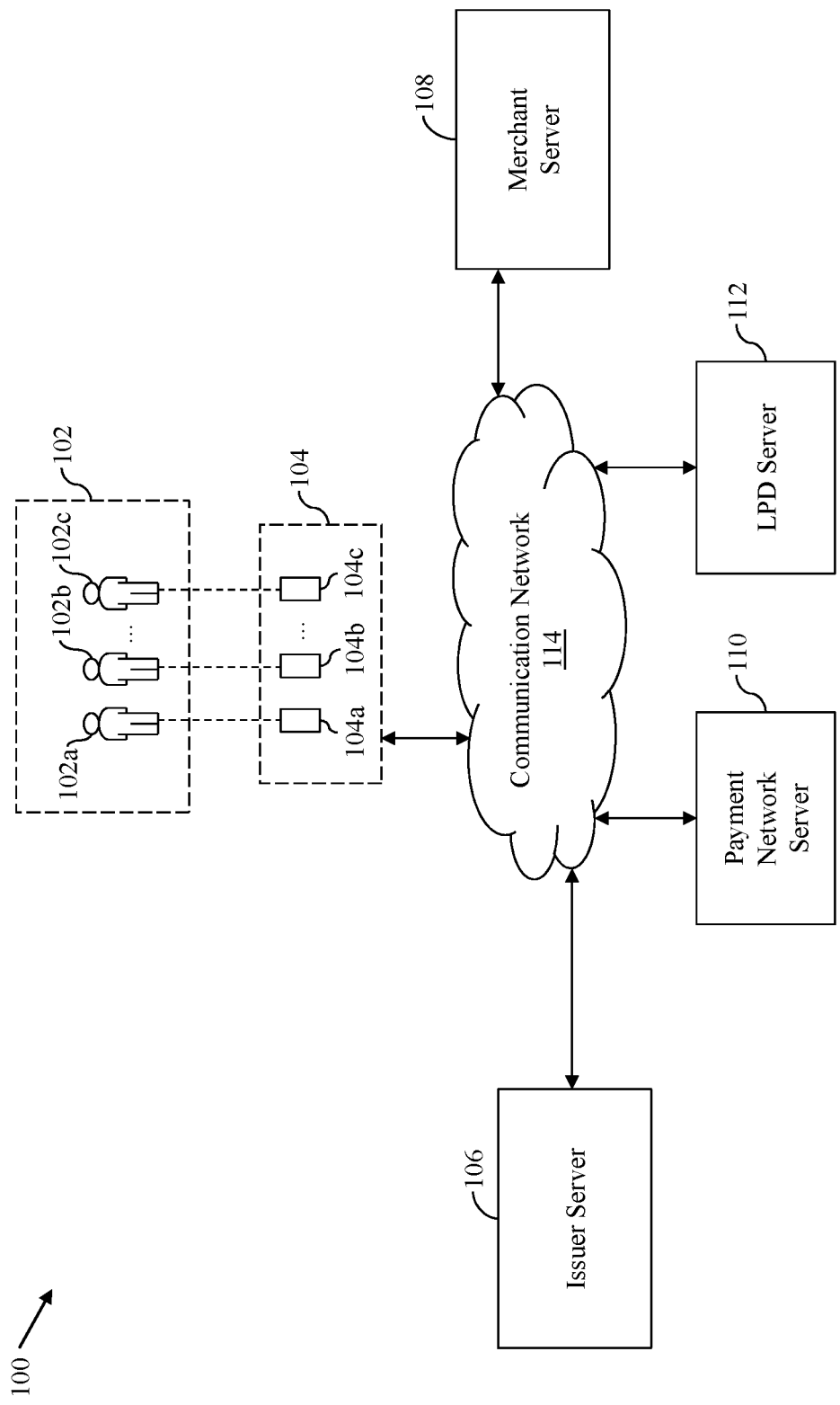
FIG. 1 is a block diagram that illustrates an exemplary system environment for disbursing loyalty points, in accordance with an exemplary embodiment of the disclosure.

Further areas of applicability of the disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

The disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Overview

A budget for a loyalty program purchased by a bank or merchant from a payment network is fixed, and is based on an estimate of transactions to be performed. Due to such estimation, the budget may be overspent, thereby causing a financial loss to the bank or merchant. Further, in case the budget is underspent, it indicates that the users' behaviors are not directly driven by the loyalty program. As a result, many users do not actively participate in the loyalty program even after they have enrolled. Thus, both overspending and underspending of the budget are disadvantageous to the bank or merchant.

Various embodiments of the disclosure provide methods and systems that solve the abovementioned problem by updating an earn rate (using which loyalty points are disbursed) for each transaction in real-time such that the loyalty points budget is efficiently utilized, which in turn keeps a controlled check on overspending and also encourages participation of other users in the loyalty program in case of underspending. A system of the disclosure includes a server that may be configured to receive loyalty points disbursement (LPD) parameters. The LPD parameters include at least an initial earn rate, a loyalty points budget, and a disbursement period. The server may be further configured to receive a first LPD request corresponding to a first transaction performed by a first user. Further, the server may be configured to update the initial earn rate based on at least one of real-time transaction data, predictive transaction data, real-time market disbursement data, and predictive market disbursement data. The real-time transaction data may include real-time available budget data and real-time available disbursement period. The predictive transaction data may include an estimate of future transactions in one or more future time intervals. The real-time market disbursement data may include a real-time disbursement rate at which loyalty points are currently being disbursed by other issuers or merchants. The predictive market disbursement data may include a future disbursement rate at which loyalty points are likely to be disbursed by other issuers or merchants. The server may assign a weight to each of the real-time transaction data, the predictive transaction data, the real-time market disbursement data, and the predictive market disbursement data for updating the initial earn rate. The server may be further configured to disburse a first set of loyalty points to the first user based on at least the updated earn rate and a first transaction amount of the first transaction.

Further, in some embodiments, upon receipt of the first LPD request, the server may be further configured to communicate a request notification to the first user. The request notification may indicate a likelihood of earning a highest earn rate after elapse of a first time interval for a batch of transactions performed by the first user during the first time interval. The batch of transactions may include at least one other transaction in addition to the first transaction. The server may be further configured to receive a preference of the first user from a first user device for earning the first set of loyalty points. In one exemplary scenario, when the preference indicates a dissent of the first user, the first set of loyalty points corresponding to the first transaction may be disbursed to the first user based on the updated earn rate after the first transaction is performed by the first user. In another exemplary scenario, when the preference indicates a consent of the first user, the first set of loyalty points corresponding to the batch of transactions may be disbursed to the first user based on at least the updated earn rate (which is the highest earn rate in the first time interval) and each transaction amount corresponding to each transaction of the batch of transactions. The server may identify the highest earn rate from a set of earn rates applicable during the first time interval after the elapse of the first time interval.

Further, in some embodiments, a likelihood of earning the first set of loyalty points by the first user for the first transaction may be higher in comparison to one or more previous transactions performed by the first user. The likelihood of earning the first set of loyalty points by the first user may be higher when previous loyalty points associated with each previous transaction of the one or more previous transactions is less than a threshold loyalty point. In such a scenario (i.e., when the previous loyalty points for each previous transaction is less than the threshold loyalty point), the server may be further configured to update the initial earn rate based on one or more previous earn rates associated with one or more previous transactions performed by one or more other users when each previous earn rate of the one or more previous earn rates is greater than a threshold earn rate.

Thus, the methods and systems of the disclosure may enable disbursement of loyalty points based on the updated earn rate for each transaction in real-time. The methods and systems, by virtue of implementation, facilitate a seamless mechanism for disbursing the loyalty points to users such that a budget set for the loyalty points is efficiently utilized without overspending and also encouraging their participation in the loyalty programs in case of underspending.

Terms Description (in Addition to Plain and Dictionary Meaning)

Server is a physical or cloud data processing system on which a server program runs. A server may be implemented in hardware or software, or a combination thereof. In one embodiment, the server is implemented as a computer program that is executed on programmable computers, such as personal computers, laptops, or a network of computer systems. The server may correspond to one of a loyalty points disbursement (LPD) server, an acquirer server, a payment network server, an issuer server, or a third-party server.

Merchant is an entity that offers various products and/or services in exchange of payments. The merchant may establish a merchant account with a financial institution to accept payments from several users.

Issuer is a financial institution where accounts of several users are established and maintained. The issuer ensures payment for authorized transactions in accordance with various payment network regulations and local legislation.

Payment network is a transaction card association that acts as an intermediate entity between acquirers and issuers to authorize and fund transactions. Examples of payment networks include Mastercard®, American Express®, VISA®, Discover®, Diners Club®, and the like. The payment network settles the transactions between various acquirers and issuers, when transaction cards are used for initiating transactions.

Transaction is an exchange of funds between two or more entities. For example, the transaction may include transferring a transaction amount from an account of a user to an account of a merchant, when the user makes a purchase of one or more products or services from the merchant. In another example, the transaction may include transferring the transaction amount from one account to another account or from one merchant account to another merchant account.

User refers to a consumer who purchases a product and/or service from a merchant and may register on an application program hosted by at least one of an issuer, a merchant, or a payment network. In the following disclosure, the "user" generally refers to a person who is registered on the application program while the term "consumer" generally refers to a person who purchases the product and/or service from the merchant. It may be appreciated that the "user" and the "consumer" may be used interchangeably in various embodiments. In various scenarios, the user may have a payment or transaction account with a financial institution such as a bank.

Loyalty programs are structured marketing strategies designed by an entity (such as an issuer, a merchant, a payment network, a third-party entity, or any combination thereof) to encourage users to continue to shop at or use the services of businesses associated with each program. These programs exist covering most types of commerce, each one having varying features and rewards-schemes.

Loyalty point is a reward that is awarded to a user in exchange of a transaction performed by the user for making a purchase from a merchant or for transferring a transaction amount to another account. The loyalty point may be awarded by an issuer, a merchant, a payment network, a third-party entity, or any combination thereof. In one example, the loyalty point(s) represents a cashback amount (such as one dollar) in exchange of a previous transaction or a batch of previous transactions. In another example, the loyalty point(s) represents a discount coupon for a subsequent transaction or a batch of subsequent transactions in exchange of a previous transaction or a batch of previous transactions. The loyalty point(s) may be awarded based on an earn rate defined by the issuer, the merchant, the payment network, the third-party entity, or any combination thereof.

Earn rate is a rate at which a user earns loyalty points in a loyalty program designed by an entity (such as an issuer, a merchant, a payment network, a third-party entity, or any combination thereof). In an exemplary scenario, the earn rate defines a count of loyalty points that may be earned by a user for a minimum amount of dollar(s) spent by the user. For example, when the earn rate is one loyalty point per ten dollars spent (i.e., the earn rate is '0.1' loyalty points per dollar spent), the user may be rewarded with ten loyalty points for a transaction worth hundred dollars. Thus, a count of loyalty points earned may be equal to a product of a transaction amount and a corresponding earn rate that is applicable to the transaction amount.

Loyalty points disbursement (LPD) parameters are parameters that are communicated by an entity (such as an issuer or a merchant) who has purchased a loyalty program from another entity (such as a payment network). The LPD parameters may include an initial earn rate, a loyalty points budget, and a disbursement period. The disbursement period is a time period within which loyalty points from the loyalty points budget may be disbursed to one or more users by using at least the initial earn rate or an updated earn rate.

FIG. 1 is a block diagram that illustrates an exemplary system environment 100 for disbursing loyalty points, in accordance with an exemplary embodiment of the disclosure. The system environment 100 includes first through third users 102a-102c (hereinafter, collectively referred to as 'the set of users 102') in possession of first through third user devices 104a-104c (hereinafter, collectively referred to as 'the set of user devices 104'), respectively. The system environment 100 further includes an issuer server 106 associated with a first issuer (not shown), a merchant server 108 associated with a first merchant (not shown), a payment network server 110 managed by a payment network (not shown), and a loyalty points disbursement (LPD) server 112 managed by the first issuer, the first merchant, the payment network, a third-party entity, or any combination thereof. The set of user devices 104, the issuer server 106, the merchant server 108, the payment network server 110, and the LPD server 112 may communicate with each other by way of a communication network 114 or through separate communication networks established therebetween.

The first user 102a is an individual, who is an account holder of a first payment account. In an embodiment, the first payment account is a payment account maintained at a financial institution such as the first issuer. In an exemplary embodiment, the first user 102a may utilize the first payment account (for example, by way of a transaction card or a digital wallet linked with the first payment account) to perform a transaction corresponding to a purchase from the first merchant or to transfer a transaction amount from the first payment account to another payment account associated with the same issuer or a different issuer. Similarly, the second and third users 102b and 102c are individuals, who are account holders of a second payment account and a third payment account, respectively. In an embodiment, the second and third payment accounts are payment accounts maintained at the same financial institution such as the first issuer or different financial institutions (e.g., second and third issuers, respectively). For the sake of ongoing discussion, it is assumed that the first, second, or third issuer is a bank and the first merchant is an e-commerce entity.

The first user device 104a is a communication device associated with the first user 102a. The first user device 104a may include suitable logic, circuitry, interface, and/or code, executable by the circuitry, that is configured to execute various service applications, for example, a service application (not shown) that facilitates the first user 102a to perform transactions (by using transactions cards such as credit and debit cards, digital wallets, or the like). The service application may be a mobile application or a web-based application hosted by at least one of the issuer, merchant, payment network, and LPD servers 106, 108, 110, and 112. The service application running on the first user device 104a may be utilized by the first user 102a to register for one or more services (such as transaction services, purchase services, loyalty program services, or the like) facilitated by at least one of the issuer, merchant, payment network, and LPD servers 106, 108, 110, and 112. The first user device 104a or the service application running on the first user device 104a may be configured to receive one or more notifications from at least one of the issuer, merchant, payment network, and LPD servers 106, 108, 110, and 112. For example, the first user device 104a or the service application running on the first user device 104a may receive a request notification from the LPD server 112. The request notification may include a query indicating a likelihood of earning a highest earn rate for performing a batch of transactions. Based on the request notification, the first user 102a may provide a preference (i.e., a consent or dissent) corresponding to the query. Further, the first user device 104a or the service application running on the first user device 104a may communicate the preference of the first user 102a to the LPD server 112.

Similarly, the second and third user devices 104b and 104c are communication devices associated with the second and third users 102b and 102c, respectively. The second and third user devices 104b and 104c are operationally similar to the first user device 104a. Examples of the first, second, or third user device 104a, 104b, or 104c may include a mobile phone, a smartphone, a personal computer, a laptop, a tablet, a phablet, or any other communication device that is known in the art and is capable of communicating via the communication network 114.

The issuer server 106 is a computing server that is operated by the first issuer. The issuer server 106 may include suitable logic, circuitry, interface, and/or code, executable by the circuitry, for processing transactions and other related operations such as loyalty points disbursement associated with the transactions. The first issuer is a financial institution that manages payment accounts of multiple users, such as the first, second, and third users 102a, 102b, and 102c. Account details of the payment accounts, such as the first, second, and third payment accounts of the first, second, and third users 102a, 102b, and 102c, respectively, established with the first issuer are stored as account profiles in a memory (not shown) of the issuer server 106 or a database server (not shown) communicatively coupled with the issuer server 106. The account details of each payment account may include an account balance, an available credit line, details of an account holder, transaction history of the account holder, loyalty points history, and other account information such as a unique account number, transaction cards linked with the unique account number, digital wallets linked with the unique account number, or the like. The details of the account holder may include name, age, gender, physical attributes, registered contact number, alternate contact number, registered e-mail ID, or the like of the account holder. In an embodiment, the issuer server 106 may be configured to manage payment accounts and/or digital wallets of each user such as the first, second, and third users 102a, 102b, and 102c. The issuer server 106 may credit or debit the payment accounts or the digital wallets based on transactions performed by each user such as the first, second, and third users 102a, 102b, and 102c. Examples of the issuer server 106 may include, but are not limited to, computers, laptops, mini-computers, mainframe computers, any non-transient and tangible machines that can execute a machine-readable code, cloud-based servers, distributed server networks, a network of computer systems, or any combination thereof.

In an embodiment, the issuer server 106 may be configured to communicate, to the LPD server 112, LPD parameters for a loyalty program purchased by the first issuer from the payment network. In another embodiment, the first merchant purchases the loyalty program and the merchant server 108 communicates the LPD parameters to the LPD server 112. In another embodiment, both of the first issuer and the first merchant purchase the loyalty program (i.e., a common loyalty program). In such embodiment, the LPD parameters may be communicated by at least one of the issuer server or the merchant server 106 or 108. The LPD parameters may include at least an initial earn rate, a loyalty points budget, and a disbursement period. An earn rate is a rate at which one or more loyalty points may be disbursed to a user (such as the first, second, or third user 102a, 102b, or 102c) based on at least a transaction amount associated with a transaction performed by the user. In other words, the earn rate is a rate at which the user earns the one or more loyalty points in a loyalty program. For example, a user may earn '2' loyalty points for every dollar spent. In one scenario, the initial earn rate is an earn rate that is used for disbursing the one or more loyalty points to one or more users in the beginning of the loyalty program. In one example, the first user 102*a* performs a first transaction worth one hundred dollars when the initial earn rate is '0.1' loyalty points per dollar spent. Thus, total loyalty points earned by the first user 102*a* for the first transaction are ten. In another scenario, the initial earn rate may be updated by the LPD server 112 and a first set of loyalty points may be disbursed based on the updated earn rate. For the sake of ongoing discussion, it is assumed that the one or more loyalty points are disbursed for the first transaction based on the initial earn rate. The loyalty points budget includes a fixed amount of loyalty points to be disbursed among the users based on their transactions wherever applicable. In a non-limiting example, it may be assumed that the loyalty points budget has one hundred million loyalty points. The disbursement period is a time period within which the one or more loyalty points from the loyalty points budget may be disbursed among the users by using at least the initial earn rate or the updated earn rate. In a non-limiting example, it may be further assumed that the disbursement period is one year. Thus, the hundred million loyalty points are to be disbursed among the users over a period of one year.

In an embodiment, various details of the payment accounts established with the first issuer may be stored as payment account profiles. Each payment account profile may be indicative of at least a transaction history of a corresponding user and a count of loyalty points earned so far by the corresponding user. For example, a first payment account profile of the first user 102*a* may be indicative of a first transaction history and a first count of total loyalty points earned by the first user 102*a*. Further, in one embodiment, the total loyalty points or a portion of the total loyalty points earned by the first user 102*a* may be transferred from the first payment account associated with the first issuer to another payment account of the first user 102*a* or an acquaintance of the first user 102*a* associated with a second issuer (not shown). In such embodiments, the issuer server 106 transfers the total loyalty points or the portion of the total loyalty points earned by the first user 102*a* from the first payment account to another payment account associated with the second issuer by way of at least one of the payment network server 110 or the LPD server 112. Such transfer of loyalty points may occur based on a consent of at least one of the first user 102*a*, the first issuer, the payment network, or the second issuer.

The merchant server 108 is a computing server that is operated by the first merchant. The merchant server 108 may include suitable logic, circuitry, interface, and/or code, executable by the circuitry, for processing transactions and other related operations such as loyalty points disbursement associated with the transactions. The merchant server 108 may be configured to establish and manage a purchase account for each user. Details of the purchase accounts may be stored as purchase account profiles such that each purchase account profile is indicative of purchases made by each user and services availed by the user. Further, the merchant server 108 may be configured to initiate a request for credit or debit of the payment accounts or the digital wallets based on purchases initiated by each user. Further, the merchant server 108 may be configured to communicate the LPD parameters to the LPD server 112 for a loyalty program purchased by the first merchant from the payment network. Examples of the merchant server 108 may include, but are not limited to, computers, laptops, mini-computers, mainframe computers, any non-transient and tangible machines that can execute a machine-readable code, cloud-based servers, distributed server networks, a network of computer systems, or any combination thereof.

The payment network server 110 is a computing server that is associated with the payment network of various transaction cards. The payment network may include suitable logic, circuitry, interfaces, and/or code, executed by the circuitry, for processing transactions that are performed using transaction cards (such as credit and debit cards) and other related operations such as loyalty points disbursement associated with the transactions. In some embodiments, the payment network server 110 may represent an intermediate entity between the issuer server 106 and an acquirer server for authorizing and funding the payment transactions performed by using the transaction cards, or any other payment modes. In some embodiments, the payment network server 110 may also represent an intermediate entity between the issuer server 106, the merchant server 108, and the LPD server 112 for processing the transactions and facilitating the disbursement of the one or more loyalty points from the loyalty points budget. Examples of the payment network may include Mastercard®, Visa®, and the like. Examples of the payment network server 110 may include, but are not limited to, computers, laptops, mini-computers, mainframe computers, any non-transient and tangible machines that can execute a machine-readable code, cloud-based servers, distributed server networks, a network of computer systems, or any combination thereof.

The LPD server 112 is a computing server that includes suitable logic, circuitry, interface, and/or code, executable by the circuitry, that is operated by an entity (such as the first issuer, the first merchant, the payment network, or any combination thereof) for facilitating the disbursement of the loyalty points from the loyalty points budget to various users in exchange of various transactions performed by these users. In an embodiment, the LPD server 112 may be configured to receive the LPD parameters from at least one of the issuer server 106 or the merchant server 108. In the beginning of the loyalty program, the LPD server 112 may disburse the one or more loyalty points for first few initial transactions based on the initial earn rate. Later, the LPD server 112 may update the initial earn rate for subsequent transactions such that the loyalty points budget is efficiently utilized so as to avoid overspending or underspending of the loyalty points budget in the disbursement period defined by at least one of the first issuer or the first merchant. For example, the LPD server 112 may receive an LPD request from the payment network server 110 when the first user 102*a* performs a second transaction for making a purchase from the first merchant. The LPD server 112 may update the initial earn rate based on at least one of real-time transaction data and predictive transaction data associated with at least one of the first issuer or the first merchant, real-time market disbursement data, and predictive market disbursement data.

The real-time transaction data includes details of real-time transactions performed by the set of users 102, real-time available budget data (i.e., remaining budget in the loyalty points budget), and real-time available disbursement period (i.e., remaining period in the disbursement period). In a non-limiting example, the loyalty points budget is ten million loyalty points and the disbursement period is thirty days. At the end of the fifteenth day (i.e., the remaining period is fifteen days), the real-time available budget (which should ideally be five million loyalty points) is two million loyalty points. In such a situation, the earn rate may be reduced for the subsequent transactions so that an overspend of the loyalty points budget may be prevented.

The predictive transaction data includes an estimate of future transactions in one or more future time intervals. The estimation of the future transactions may be based on a spending pattern of the set of users 102 (i.e., based on details of past transactions of the set of users 102 in one or more past time intervals). The one or more future time intervals may encompass an occasion of upcoming events (such as one or more festive events, sporting events, political events, or the like) during which certain merchants may offer high discounts. The LPD server 112 may employ a machine learning algorithm to generate one or more predictor models. The predictor models obtain at least one of the spending pattern of the set of users 102, information about the upcoming events, offers or discounts from various issuers and/or merchants (both online and offline) applicable during the upcoming events, and the like, as inputs, and generate prediction outputs. The prediction outputs may indicate probabilities of occurrence of the future transactions by the set of users 102.

The real-time market disbursement data includes a real-time disbursement rate at which loyalty points are currently being disbursed by other issuers or merchants (e.g., competitors). In one example, it may be determined that other issuers are disbursing the loyalty points with a high disbursement rate. The first issuer may decide to include an offset earn rate as an additional parameter in the LPD parameters. The offset earn rate may represent a value to be added to a current earn rate for each transaction or may represent a percentage increase to be made in the current earn rate for each transaction. Similarly, the predictive market disbursement data includes a future disbursement rate at which loyalty points are likely to be disbursed by other issuers or merchants.

For updating the initial earn rate (and the subsequent earn rates), the LPD server 112 may assign first, second, third, and fourth weights to the real-time transaction data, the predictive transaction data, the real-time market disbursement data, and the predictive market disbursement data, respectively. The first through fourth weights may have equal or different initial values. The first through fourth weights may be determined based on at least one of the real-time available budget data, the real-time available disbursement period, the estimate of future transactions, the real-time disbursement rate, the future disbursement rate, or the like. The updating of the earn rate using the first through fourth weights may be performed in any number of different scenarios and will be understood by those of skill in the art. The LPD server 112 may automatically update the first through fourth weights based on a linear predictive algorithm that is known in the art.

Upon updating the initial earn rate, the LPD server 112 may disburse the first set of loyalty points to the first user 102a based on a current earn rate (i.e., the updated earn rate at a time when the LPD request is received) and a second transaction amount corresponding to the second transaction performed by the first user 102a. In one example, the LPD server 112 disburses the first set of loyalty points based on a per-dollar-spent basis (i.e., a user gets loyalty points per dollar spent per transaction). In another example, the LPD server 112 disburses the first set of loyalty points when a corresponding transaction amount is greater than a threshold transaction amount (i.e., the user gets loyalty points per transaction when the corresponding transaction amount exceeds the threshold transaction amount). In another example, the LPD server 112 randomly disburses the first set of loyalty points. Under such a scenario, a likelihood of earning the first set of loyalty points for a subsequent transaction is higher in comparison to previous transactions, when previous loyalty points associated with each previous transaction is less than a threshold loyalty point. It will be understood by a person skilled in the art that the disbursement of the first set of loyalty points is not limited to the above-mentioned examples.

In another embodiment, when the loyalty program is purchased by both of the first issuer and the first merchant, the merchant server 108 may communicate an additional LPD parameter. The additional LPD parameter may include a break-up percentage value. Based on the break-up percentage value and the first set of loyalty points disbursed to the first user 102a on behalf of the first issuer (i.e., based on the LPD parameters communicated by the issuer server 106), additional loyalty points may be disbursed to the first user 102a on behalf of the first merchant. In a non-limiting example, it may be assumed that one hundred loyalty points are disbursed to the first user 102a on behalf of the first issuer. Further, the break-up percentage value is assumed to be '50%' as defined by the first merchant i.e., the first merchant may disburse 50% additional loyalty points of the first set of loyalty points disbursed by the first issuer. Thus, the first user 102a is provided with additional fifty loyalty points on behalf of the first merchant. Here, total loyalty points earned by the first user 102a is one hundred and fifty loyalty points that includes the loyalty points offered by the first issuer and the first merchant.

In another embodiment, when the loyalty program is purchased by both of the first issuer and the first merchant, the first merchant may not explicitly disburse the additional loyalty points to the first user 102a. Instead, the additional loyalty points worth a portion of a merchant discount rate (MDR) may be disbursed by the payment network on behalf of the first merchant. In a non-limiting example, an original MDR is '5%' (i.e., '5%' of each transaction amount is paid to the payment network by the first merchant) and the second transaction made by the first user 102a is worth one hundred dollars. It may be assumed that the first merchant agrees with disbursing the additional loyalty points worth '20%' of the original MDR (i.e., an effective MDR for the merchant is '6%'). Thus, the first user 102a is provided with the additional loyalty points worth one dollar (i.e., '1%' of hundred dollars) while '5' dollars are received by the payment network as the MDR (i.e., '5%' of hundred dollars).

In another embodiment, the LPD server 112 may identify, from the set of users 102, first and second subsets of users (not shown). Each of the first subset of users is a user who has previously performed transactions and each of previous earn rates for the previous transactions is less than a threshold earn rate, as compared to previous earn rates associated with previous transactions performed by each of the second subset of users. Further, each previous earn rate associated with each of the previous transactions of each of the second subset of users is greater than the threshold earn rate. In such a scenario, the likelihood of earning the first set of loyalty points by each of the first subset of users for the subsequent transaction may be higher in comparison to the previous transactions performed by each of the first subset of users, when previous loyalty points associated with each previous transaction is less than the threshold loyalty point. Here, the first set of loyalty points for the subsequent transaction may be higher than the previous loyalty points associated with each previous transaction. The LPD server 112 may be configured to disburse the first set of loyalty points to each of the first subset of users for a subsequent transaction. (i.e., a likelihood of earning greater loyalty points by each user of the first subset of users for the subsequent transaction is high in comparison to the second subset of users). The LPD server 112 may disburse the first set of loyalty points by increasing the earn rate for the subsequent transaction performed by each of the first subset of users and decreasing the earn rate for the subsequent transaction performed by each of the second subset of users. For the sake of simplicity of the ongoing discussion, it may be assumed that the first and second subsets of users include the first and second users 102a and 102b, respectively. For a first subsequent transaction performed by the first user 102a, a current earn rate may be offset with a first value which is greater than zero. Thus, based on the current earn rate that is offset with the first value, the first user 102a is provided with the first set of loyalty points for the first subsequent transaction. Further, for a second subsequent transaction of the second user 102b, the current earn rate may be offset with a second value which is less than zero. The current earn rate that is offset with the second value compensates the current earn rate that is offset with the first value. In a non-limiting example, a current earn rate (i.e., a global earn rate) is '2' loyalty points per dollar spent. For the first subsequent transaction, the current earn rate may be offset with a value of '1'. Thus, the first user 102a is provided with loyalty points based on an earn rate of '3' loyalty points per dollar spent. Further, for the second subsequent transaction, the current earn rate may be offset with a value of −1'. Thus, the second user 102b is provided with loyalty points based on an earn rate of '1' loyalty point per dollar spent. Thus, the global earn rate of '2' loyalty points per dollar spent is maintained.

In another embodiment, the LPD server 112 may communicate the request notification to the first user 102a upon receipt of the LPD request. The LPD request may be received by the LPD server 112 from the payment network server 110 when the first user 102a performs the second transaction for making the purchase from the first merchant. The request notification may indicate a likelihood of earning the highest earn rate after elapse of a first time interval for the batch of transactions performed by the first user 102a during the first time interval. For example, the request notification may indicate a likelihood of earning the first set of loyalty points based on the highest earn rate during the first time interval, after the elapse of the first time interval, for the batch of transactions performed by the first user 102a during the first time interval. The batch of transactions may include at least one or more other transactions in addition to the second transaction. Further, in response to the communication of the request notification, the first user 102a may provide the preference for earning the first set of loyalty points. In one scenario, when the preference indicates a dissent of the first user 102a, the first set of loyalty points corresponding to the second transaction may be disbursed to the first user 102a based on at least the updated earn rate and the second transaction amount of the second transaction performed by the first user 102a. In another scenario, when the preference indicates a consent of the first user 102a, the LPD server 112 may identify, after the elapse of the first time interval, the highest earn rate from a set of earn rates applicable during the first time interval. In some embodiments, the highest earn rate may be identified from a set of updated earn rates applicable during the first time interval. Further, the first set of loyalty points corresponding to the batch of transactions may be disbursed to the first user 102a based on the identified highest earn rate and the transaction amount of each transaction of the batch of transactions. In one example, the batch of transactions includes all the transactions performed by all users (including the first user 102a) during the first time interval.

In a non-limiting example, the first user 102a performs a transaction at a first time instance when the earn rate is '1' loyalty points per dollar spent. Further, the LPD server 112 predicts that there is a likelihood of earning a highest earn rate of up to '2' loyalty points per dollar spent during the first time interval. The first time instance is a start time of the first time interval and a second time instance is an end time of the first time interval. The LPD server 112 communicates a request notification to the first user 102a to obtain a preference of the first user 102a for earning the first set of loyalty points. In one scenario, the preference indicates a consent of the first user 102a. In such a scenario, no loyalty points are disbursed to the first user 102a for the transaction performed at the first time instance. The first user 102a further continues to perform transactions and ends up performing a total of '3' transactions worth '100', '50', and '25' dollars till the second time instance is elapsed. The updated earn rates during the first time interval are identified as '1', '1.5', and '2' loyalty points per dollar spent. Thus, the LPD server 112 identifies '2' loyalty points per dollar spent as the highest earn rate. After the elapse of the first time interval, the LPD server 112 disburses the first set of loyalty points to the first user 102a based on the highest earn rate (i.e., 2' loyalty points per dollar spent) and the transaction amount (i.e., '100', '50', and '25' dollars) associated with each of the '3' transactions. In the ongoing exemplary scenario, the first set of loyalty points includes '350' loyalty points that are earned by the first user 102a after the elapse of the first time interval. In another scenario, the preference indicates a dissent of the first user 102a. In such a scenario, the first user 102a is provided with the first set of loyalty points that includes '100' loyalty points (i.e., based on the updated earn rate of '1' for the transaction worth '100' dollars performed by the first user 102a at the first time instance).

Though the LPD server 112 is shown to be a standalone entity in FIG. 1, in some embodiments, the LPD server 112 may be integrated with any of the issuer server 106, the merchant server 108, the payment network server 110, or any other third-party server, without deviating from the scope of the disclosure. For example, when the LPD server 112 is integrated with the issuer server 106, the functionality of the LPD server 112 may be implemented and executed by the issuer server 106. In another example, when the LPD server 112 is integrated with the merchant server 108, the functionality of the LPD server 112 may be implemented and executed by the merchant server 108. In another example, when the LPD server 112 is integrated with the payment network server 110, the functionality of the LPD server 112 may be implemented and executed by the payment network server 110.

The communication network 114 is a medium through which content and messages are transmitted between the first through third user devices 104a-104c, the issuer server 106, the merchant server 108, the payment network server 110, and the LPD server 112. Examples of the communication network 114 may include, but are not limited to, a Wi-Fi network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the system environment 100 may connect to the communication network 114 in accordance with various wired and wireless communication protocols, such as Transmission Control Protocol and Internet Protocol (TCP/IP), User Datagram Protocol (UDP), Long Term Evolution (LTE) communication protocols, or any combination thereof.

In operation, a user (such as the first, second, or third user 102a, 102b, or 102c) performs the first transaction corresponding to the first purchase from the first merchant. The issuer server 106 provides the LPD parameters to the LPD server 112. The LPD parameters include at least the initial earn rate, the loyalty points budget, and the disbursement period. The LPD server 112 disburses the one or more loyalty points from the loyalty points budget to the user based on the initial earn rate and the first transaction amount of the first transaction. Further, the LPD server 112 may receive the LPD request corresponding to the second transaction performed by a user such as the first user 102a. The LPD server 112 may be configured to update the initial earn rate based on at least one of the real-time transaction data, the predictive transaction data, the real-time market disbursement data, and the predictive market disbursement data. The real-time transaction data may include the real-time available budget data and the real-time available disbursement period. The predictive transaction data may include the estimate of the future transactions in the one or more future time intervals. The real-time market disbursement data may include the real-time disbursement rate at which loyalty points are currently being disbursed by other issuers or merchants. The predictive market disbursement data may include the future disbursement rate at which loyalty points are likely to be disbursed by other issuers or merchants. The LPD server 112 may further assign a weight to each of the real-time transaction data, the predictive transaction data, the real-time market disbursement data, and the predictive market disbursement data for updating the initial earn rate. The LPD server 112 may be further configured to disburse the first set of loyalty points to the first user 102a based on at least the updated earn rate and the second transaction amount of the second transaction.

Further, in some embodiments, upon receipt of the LPD request, the LPD server 112 may communicate the request notification to the first user 102a. The request notification may indicate a likelihood of earning the highest earn rate after the elapse of the first time interval for the batch of transactions performed by the first user 102a during the first time interval. The batch of transactions may include at least one other transaction in addition to the second transaction. The LPD server 112 may further receive the preference of the first user 102a from the first user device 104a for earning the first set of loyalty points. In one exemplary scenario, when the preference indicates a dissent of the first user 102a, the first set of loyalty points corresponding to the second transaction may be disbursed to the first user 102a based on at least the updated earn rate and the second transaction amount of the second transaction performed by the first user 102a. In another exemplary scenario, when the preference indicates a consent of the first user 102a, the first set of loyalty points corresponding to the batch of transactions may be disbursed to the first user 102a based on at least the updated earn rate (which is the highest earn rate in the first time interval) and each transaction amount corresponding to each transaction of the batch of transactions. The LPD server 112 may identify the highest earn rate from the set of earn rates applicable during the first time interval after the elapse of the first time interval.

Further, in some embodiments, a likelihood of earning the first set of loyalty points by the first user 102a for the second transaction may be higher in comparison to one or more previous transactions performed by the first user 102a. The likelihood of earning the first set of loyalty points by the first user 102a may be higher when previous loyalty points associated with each previous transaction of the one or more previous transactions is less than the threshold loyalty point. In such a scenario (i.e., when the previous loyalty points for each previous transaction is less than the threshold loyalty point), the LPD server 112 may update the initial earn rate based on one or more previous earn rates associated with one or more previous transactions performed by one or more other users when each previous earn rate of the one or more previous earn rates is greater than the threshold earn rate.

Figure 2:
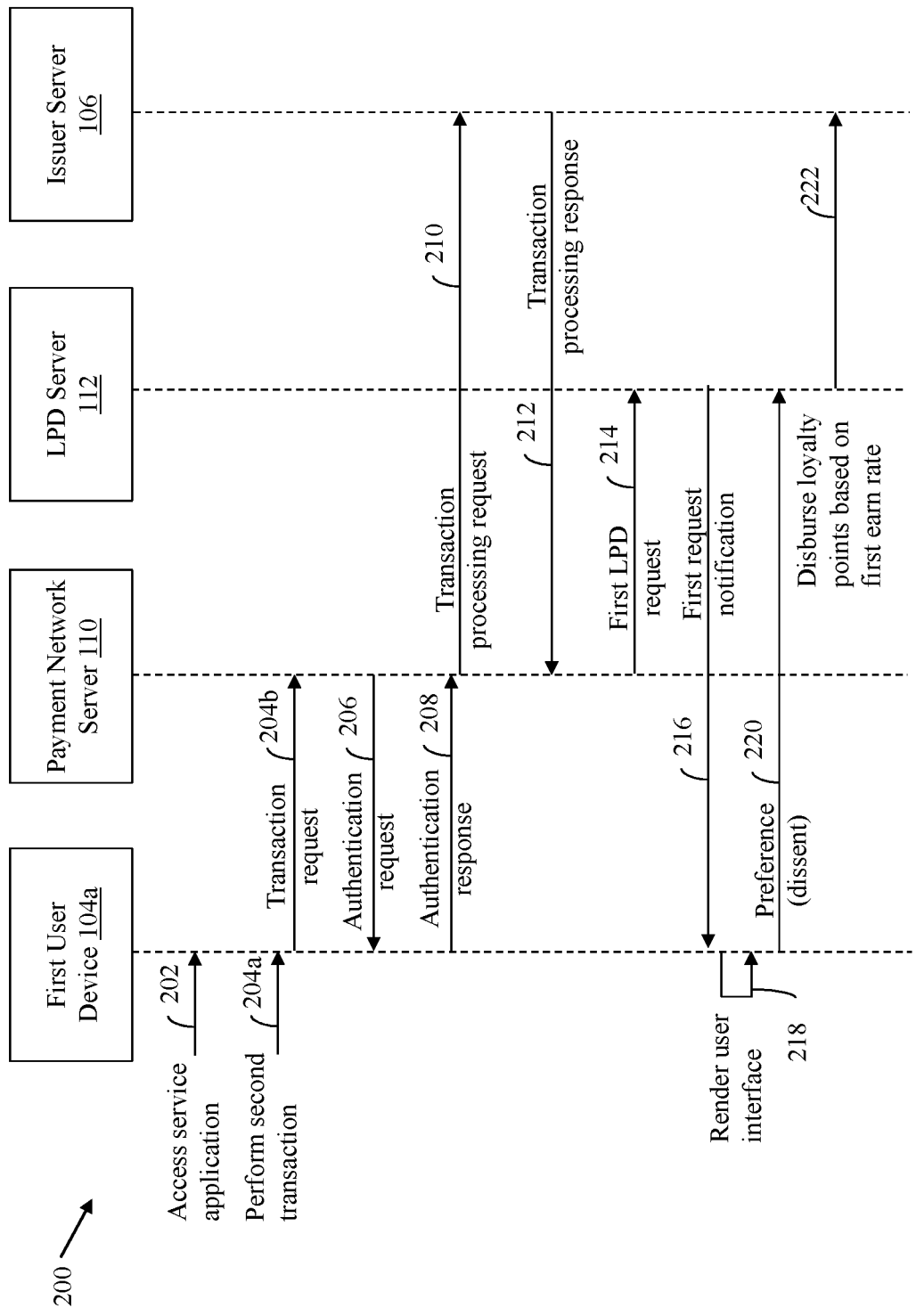
FIG. 2 represents a process flow diagram that illustrates an exemplary scenario for disbursing loyalty points to a first user of a set of users of FIG. 1, in accordance with an exemplary embodiment of the disclosure.

FIG. 2 represents a process flow diagram 200 that illustrates an exemplary scenario for disbursing loyalty points to the first user 102a, in accordance with an exemplary embodiment of the disclosure. The process flow diagram 200 involves the first user device 104a, the issuer server 106, the payment network server 110, and the LPD server 112. In this exemplary scenario, it is assumed that the first user 102a communicates a dissent for earning the first set of loyalty points with the highest earn rate for the batch of transactions.

The first user device 104a may be utilized by the first user 102a to access the service application running on the first user device 104a (as shown by arrow 202). The first user 102a performs the second transaction using the first user device 104a (as shown by arrow 204a). The second transaction may be performed by using transaction card information or a digital wallet associated with the first payment account of the first user 102a by way of the service application. The service application communicates a transaction request corresponding to the second transaction to the payment network server 110 (as shown by arrow 204b). The service application may further communicate details of the second transaction (such as the second transaction amount corresponding to the second transaction) and details of an acquiring entity (such as a bank account number). The acquiring entity is an entity that receives the second transaction amount (e.g., an acquirer bank with which the first merchant has a payment account). Based on the transaction request, the payment network server 110 communicates a first authentication request to the first user 102a through the service application running on the first user device 104a (as shown by arrow 206). In one example, the first authentication request may include a one-time-password (OTP). In another example, the first authentication request is a user interface (UI) screen rendered by the service application. The UI screen may include input fields for receiving a user identifier (ID) and a password associated with the first payment account of the first user 102a. The service application running on the first user device 104a communicates a first authentication response to the payment network server 110 (as shown by arrow 208). In one example, the first authentication response includes the OTP included in the first authentication request. In another example, the first authentication response includes the user ID and the password associated with the first payment account of the first user 102a.

The payment network server 110 validates the first authentication response. If the first authentication response is successfully validated, the payment network server 110 communicates a first transaction processing request to the issuer server 106 to process the second transaction (as shown by arrow 210). After successful verification and authentication, the issuer server 106 successfully processes the second transaction and communicates a first transaction processing response indicating successful processing of the second transaction to the payment network server 110 (as shown by arrow 212). Although, for the sake of simplicity of the ongoing discussion, various intermediate steps of authorization, authentication, verification, and settlement have not been described in detail, such steps are well known by those of skill in the art. Methods for processing the various payment transactions will be apparent to a person of ordinary skill in the art and may include processing of the payment transactions via the traditional four-party system or the traditional three-party system. Further, based on successful processing of the second transaction, the second transaction amount may be debited by the issuer server 106 from the first payment account of the first user 102*a* and credited to a merchant payment account of the first merchant.

Upon receiving the first transaction processing response from the issuer server 106, the payment network server 110 communicates a first LPD request to the LPD server 112 for disbursing the first set of loyalty points to the first user 102*a* for the second transaction (as shown by arrow 214). For the sake of ongoing discussion, a current earn rate (i.e., an updated earn rate at a time when the first LPD request is received by the LPD server 112) has been referred to as a first earn rate. The updated earn rate may be obtained by updating the initial earn rate based on at least one of the real-time transaction data, the predictive transaction data, the real-time market disbursement data, and the predictive market disbursement data. Upon receiving the first LPD request, the LPD server 112 may predict a likelihood of earning the first set of loyalty points based on the highest earn rate during the first time interval for the batch of transactions including the second transaction performed by the first user 102*a* during the first time interval. Thus, the LPD server 112 communicates a first request notification to the first user 102*a* through the service application running on the first user device 104*a* (as shown by arrow 216). The first request notification indicates the likelihood of earning the first set of loyalty points for the batch of transactions with the highest earn rate during the first time interval. The service application renders a UI screen on a display (not shown) of the first user device 104*a* indicating the likelihood of earning the first set of loyalty points for the batch of transactions with the highest earn rate during the first time interval (as shown by arrow 218). The service application communicates the preference of the first user 102*a* for earning the first set of loyalty points to the LPD server 112 (as shown by arrow 220). In the ongoing exemplary scenario, since the preference indicates a dissent of the first user 102*a*, the LPD server 112 disburses the first set of loyalty points to the first user 102*a* based on the first earn rate and the second transaction amount associated with the second transaction (as shown by arrow 222). Further, the LPD server 112 communicates the first set of loyalty points to the issuer server 106. In an embodiment, the first set of loyalty points is stored in the first payment account profile of the first user 102*a* by the issuer server 106. The first payment account profile may be associated with the first payment account of the first user 102*a*.

Figure 3A:
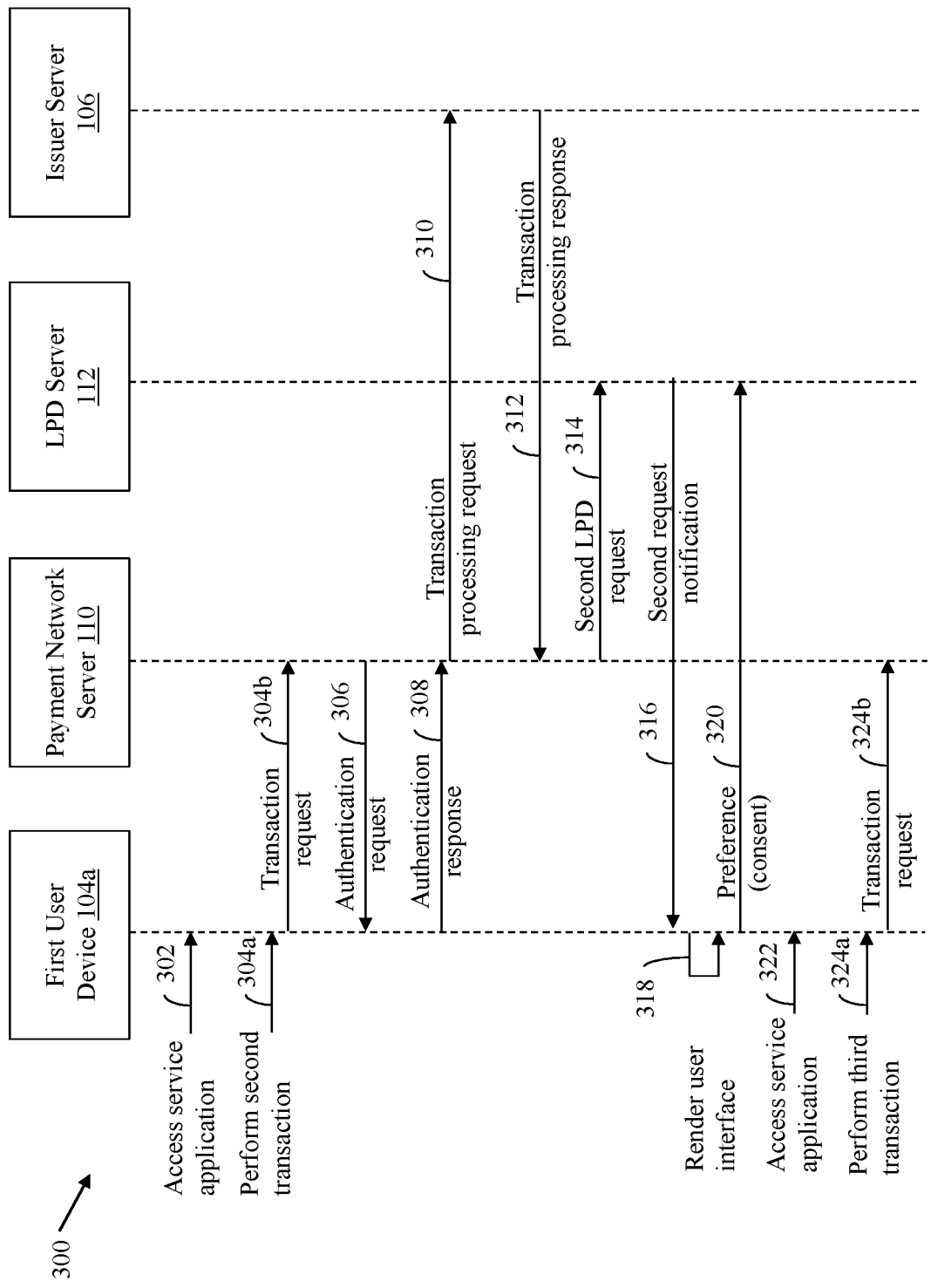
FIGS. 3A and 3B, collectively, represent a process flow diagram that illustrates an exemplary scenario for disbursing loyalty points to the first user, in accordance with an exemplary embodiment of the disclosure.
Figure 3B:
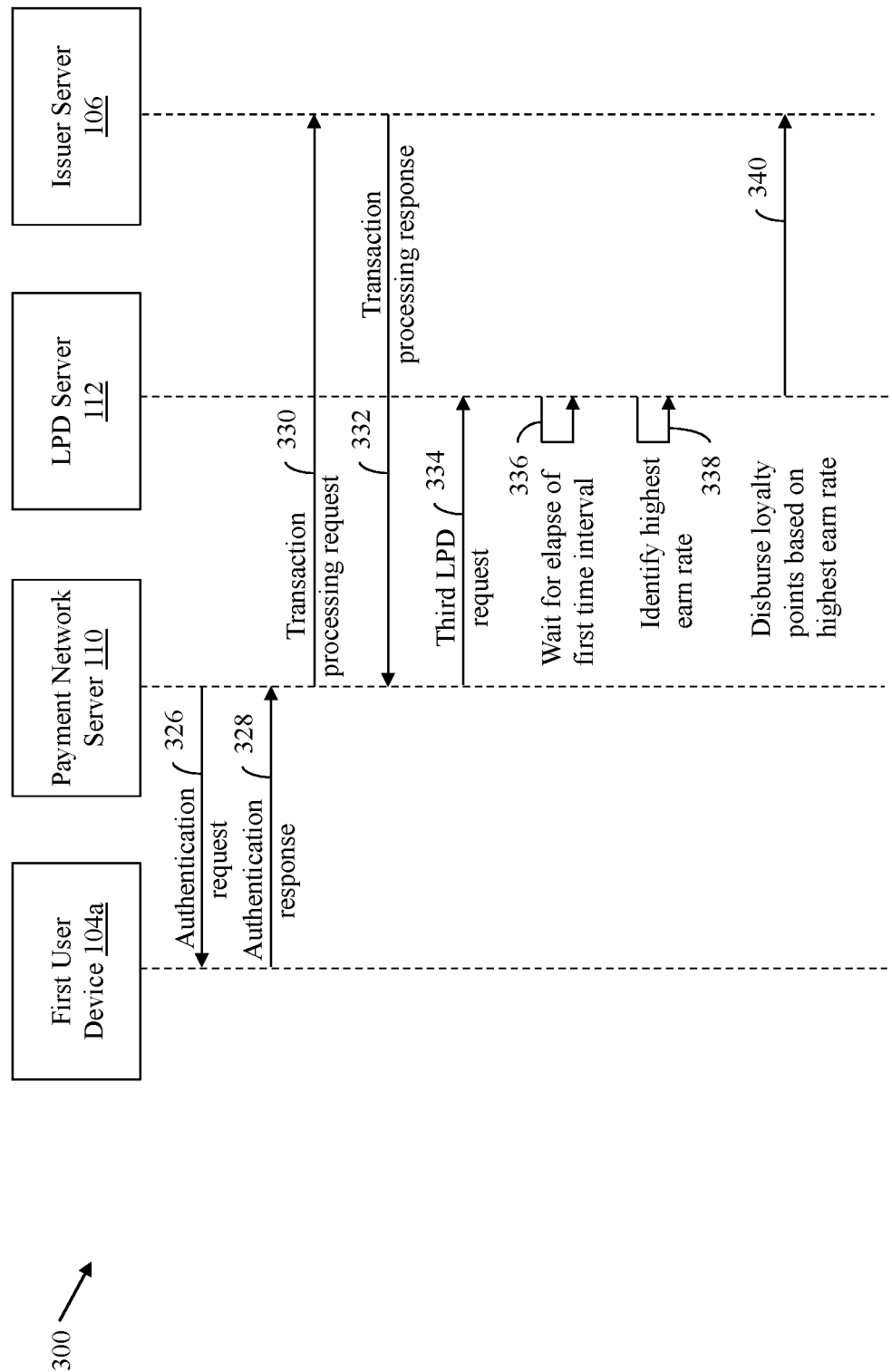

FIGS. 3A and 3B, collectively, represent a process flow diagram 300 that illustrates an exemplary scenario for disbursing loyalty points to the first user 102*a*, in accordance with an exemplary embodiment of the disclosure. The process flow diagram 300 involves the first user device 104*a*, the issuer server 106, the payment network server 110, and the LPD server 112. In this exemplary scenario, it is assumed that the first user 102*a* communicates a consent for earning the first set of loyalty points with the highest earn rate for the batch of transactions.

The first user device 104*a* may be utilized by the first user 102*a* to access the service application running on the first user device 104*a* (as shown by arrow 302). The first user 102*a* performs the second transaction using the first user device 104*a* (as shown by arrow 304*a*). The second transaction may be performed by using transaction card information or digital wallet associated with the first payment account of the first user 102*a* by way of the service application. The service application communicates a transaction request corresponding to the second transaction to the payment network server 110 (as shown by arrow 304*b*). The service application may further communicate details of the second transaction (such as the second transaction amount corresponding to the second transaction) and details of an acquiring entity (such as a bank account number). The acquiring entity is an entity that receives the second transaction amount (e.g., an acquirer bank with which the first merchant has a payment account). Based on the transaction request, the payment network server 110 communicates a second authentication request to the first user 102*a* through the service application running on the first user device 104*a* (as shown by arrow 306). In one example, the second authentication request may include a one-time-password (OTP). In another example, the second authentication request is a user interface (UI) screen rendered by the service application. The UI screen may include input fields for receiving a user ID and a password associated with the first payment account of the first user 102*a*. The service application communicates a second authentication response to the payment network server 110 (as shown by arrow 308). In one example, the second authentication response includes the OTP included in the second authentication request. In another example, the second authentication response includes the user ID and the password associated with the first payment account of the first user 102*a*.

The payment network server 110 validates the second authentication response. If the second authentication response is successfully validated, the payment network server 110 communicates a second transaction processing request to the issuer server 106 to process the second transaction (as shown by arrow 310). After successful verification and authentication, the issuer server 106 successfully processes the second transaction and communicates a second transaction processing response indicating successful processing of the second transaction to the payment network server 110 (as shown by arrow 312). Although, for the sake of simplicity of the ongoing discussion, various intermediate steps of authorization, authentication, verification, and settlement have not been described in detail, such steps are well known by those of skill in the art. Methods for processing the various payment transactions will be apparent to a person of ordinary skill in the art and may include processing of the payment transactions via the traditional four-party system or the traditional three-party system. Further, based on successful processing of the second transaction, the second transaction amount may be debited by the issuer server 106 from the first payment account of the first user 102*a* and credited to a merchant payment account of the first merchant.

Upon receiving the second transaction processing response from the issuer server 106, the payment network server 110 communicates a second LPD request to the LPD server 112 for disbursing the first set of loyalty points to the first user 102*a* for the second transaction (as shown by arrow 314). For the sake of ongoing discussion, a current earn rate (i.e., an updated earn rate at a time when the second LPD request is received by the LPD server 112) has been referred to as a second earn rate. The updated earn rate may be obtained by updating the initial earn rate based on at least one of the real-time transaction data, the predictive transaction data, the real-time market disbursement data, and the predictive market disbursement data. Upon receiving the second LPD request, the LPD server 112 may predict a likelihood of earning the first set of loyalty points based on the highest earn rate during the first time interval for the batch of transactions including the second transaction performed by the first user 102a during the first time interval. Thus, the LPD server 112 communicates a second request notification to the first user 102a through the service application running on the first user device 104a (as shown by arrow 316). The second request notification is similar to the first request notification and indicates a likelihood of earning the first set of loyalty points for the batch of transactions with the highest earn rate during the first time interval. The service application renders a UI screen on a display (not shown) of the first user device 104a indicating the likelihood of earning the first set of loyalty points for the batch of transactions with the highest earn rate during the first time interval (as shown by arrow 318). The service application communicates the preference of the first user 102a for earning the first set of loyalty points to the LPD server 112 (as shown by arrow 320). In the ongoing exemplary scenario, since the preference indicates a consent of the first user 102a, the LPD server 112 does not disburse any loyalty points to the first user 102a after receiving the second LPD request. Instead, the LPD server 112 waits till the elapse of the first time interval.

The first user device 104a may further be utilized by the first user 102a to access the service application running on the first user device 104a (as shown by arrow 322). The first user 102a performs a third transaction using the first user device 104a (as shown by arrow 324a). The third transaction may be performed by using the transaction card information or digital wallet associated with the first payment account of the first user 102a by way of the service application. The service application communicates a transaction request corresponding to the third transaction to the payment network server 110 (as shown by arrow 324b). The service application may further communicate details of the third transaction (such as a third transaction amount corresponding to the third transaction) and details of an acquiring entity (such as a bank account number). The acquiring entity is an entity that receives the third transaction amount (e.g., an acquirer bank with which the first merchant has a payment account). Based on the transaction request, the payment network server 110 communicates a third authentication request to the first user 102a through the service application running on the first user device 104a (as shown by arrow 326). In one example, the third authentication request may include a one-time-password (OTP). In another example, the third authentication request is a user interface (UI) screen rendered by the service application. The UI screen may include input fields for receiving a user ID and a password associated with the first payment account of the first user 102a. The service application communicates a third authentication response to the payment network server 110 (as shown by arrow 328). In one example, the third authentication response includes the OTP included in the third authentication request. In another example, the third authentication response includes the user ID and the password associated with the first payment account of the first user 102a.

The payment network server 110 validates the third authentication response. If the third authentication response is successfully validated, the payment network server 110 communicates a third transaction processing request to the issuer server 106 to process the third transaction (as shown by arrow 330). After successful verification and authentication, the issuer server 106 successfully processes the third transaction and communicates a third transaction processing response indicating successful processing of the third transaction to the payment network server 110 (as shown by arrow 332). Although, for the sake of simplicity of the ongoing discussion, various intermediate steps of authorization, authentication, verification, and settlement have not been described in detail, such steps are well known by those of skill in the art. Methods for processing the various payment transactions will be apparent to a person of ordinary skill in the art and may include processing of the payment transactions via the traditional four-party system or the traditional three-party system. Further, based on successful processing of the third transaction, the third transaction amount may be debited by the issuer server 106 from the first payment account of the first user 102a and credited to a merchant payment account of the first merchant.

Upon receiving the third transaction processing response from the issuer server 106, the payment network server 110 communicates a third LPD request to the LPD server 112 for disbursing the first set of loyalty points to the first user 102a (as shown by arrow 334). For the sake of ongoing discussion, a current earn rate (i.e., an updated earn rate at a time when the third LPD request is received by the LPD server 112) has been referred to as a third earn rate. The updated earn rate may be obtained by updating the initial earn rate (such as the second earn rate) based on at least one of the real-time transaction data, the predictive transaction data, the real-time market disbursement data, and the predictive market disbursement data. Further, the third earn rate may be higher than the second earn rate. It may be assumed that the third LPD request is received before the elapse of the first time interval.

Since the first time interval has not elapsed, the LPD server 112 does not generate a third request notification. The LPD server 112 waits till the first time interval has elapsed (as shown by arrow 336). Although not shown for the sake of simplicity of the ongoing discussion, it will be understood by a person skilled in the art that the first user 102a may further perform additional transactions before the elapse of the second time interval.

After the first time interval has elapsed, the LPD server 112 identifies the highest earn rate (i.e., the third earn rate) from the set of earn rates (such as the second and third earn rates) applicable during the first time interval (as shown by arrow 338). Thereafter, the LPD server 112 disburses the first set of loyalty points to the first user 102a based on the highest earn rate and the second and third transaction amounts associated with the second and third transactions (as shown by arrow 340). Further, the LPD server 112 communicates the first set of loyalty points to the issuer server 106. In an embodiment, the first set of loyalty points is stored in the first payment account profile of the first user 102a by the issuer server 106. The first payment account profile may be associated with the first payment account of the first user 102a.

Figure 4:
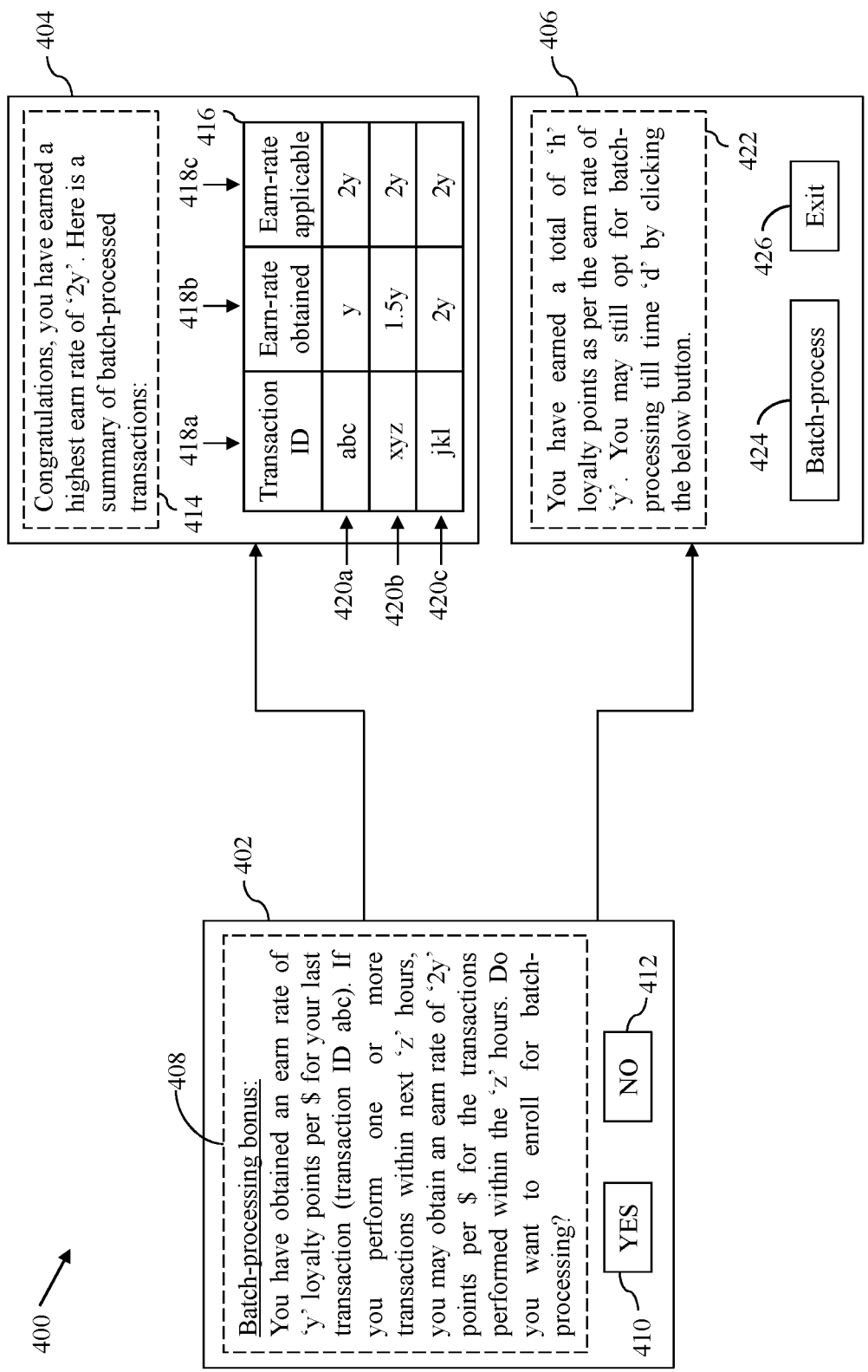
FIG. 4 represents an exemplary scenario that illustrates user interface (UI) screens of a service application rendered on a first user device of FIG. 1, in accordance with an exemplary embodiment of the disclosure.

FIG. 4 represents an exemplary scenario 400 that illustrates UI screens 402-406 of the service application rendered on the first user device 104a, in accordance with an exemplary embodiment of the disclosure. The UI screen 402 is rendered on a display (not shown) of the first user device 104a. Further, the UI screen 402 represents a request notification communicated by the LPD server 112.

The request notification is communicated to the first user 102a when the LPD server 112 has predicted the first time interval during which there is a likelihood of obtaining the highest earn rate. On receiving the request notification by the service application, the UI screen 402 may be rendered on the display of the first user device 104a. The UI screen 402 may include a first message 408. The UI screen 402 may further include one or more selectable options such as first option 410 and a second option 412. The first option 410 (i.e., 'YES' option) or the second option 412 (i.e., 'NO' option) may be selected by the first user 102a to indicate the preference of the first user 102a for earning the first set of loyalty points. For example, the first user 102a may select the first option 410 for earning the first set of loyalty points for the batch of transactions based on the highest earn rate associated with the first time interval during which the first user 102a performs the batch of transactions. Further, the first user 102a may select the second option 412 for earning the first set of loyalty points for the current transaction based on the current earn rate. The first message 408 may indicate a batch-processing bonus (i.e., the likelihood to earn the first set of loyalty points with the highest earn rate for the batch of transactions performed during the first time interval). When the first user 102a selects the first option 410 (i.e., a preference of the first user 102a indicates a consent), the UI screen 404 is rendered on the display of the first user device 104a after elapse of the first time interval.

The UI screen 404 may include a second message 414 that indicates the highest earn rate to the first user 102a. The second message 414 may further indicate a summary of transactions performed during the first time interval and the corresponding updated earn rates. The summary may include a table 416. The table 416 may include first through third columns 418a-418c and first through third rows 420a-420c. The first through third columns 418a-418c may represent values of transaction ID, earn rate obtained, and earn rate applicable (i.e., a highest earn rate obtained during the first time interval), respectively. Each row of the first through third rows 420a-420c represents a unique transaction performed by the first user 102a during the first time interval. For the sake of simplicity, the table 416 is shown to include three rows and columns. However, it will be understood by a person skilled in the art that the table 416 may include additional columns (such as transaction time, transaction amount, total loyalty points, and the like) and additional rows (based on transactions performed by the first user 102a).

When the first user 102a selects the second option 412 (i.e., a preference of the first user 102a indicates a dissent), the UI screen 406 is rendered on the display of the first user device 104a. The UI screen 406 may include a third message 422. The UI screen 406 may further include one or more selectable options such as third and fourth options 424 and 426. The third message 422 indicates the total loyalty points that may be earned by the first user 102a for the last transaction. The third message 422 may further indicate the first user 102a that the batch-processing option may be availed till a threshold time. The first user 102a may decide to communicate a consent for batch-processing, at a later time (i.e., before an elapse of the threshold time), by clicking the third option 424 (i.e., 'Batch-process' option). The first user 102a may also decide to communicate a dissent for batch-processing by clicking the fourth option 426 (i.e., 'Exit' option).

Figure 5:
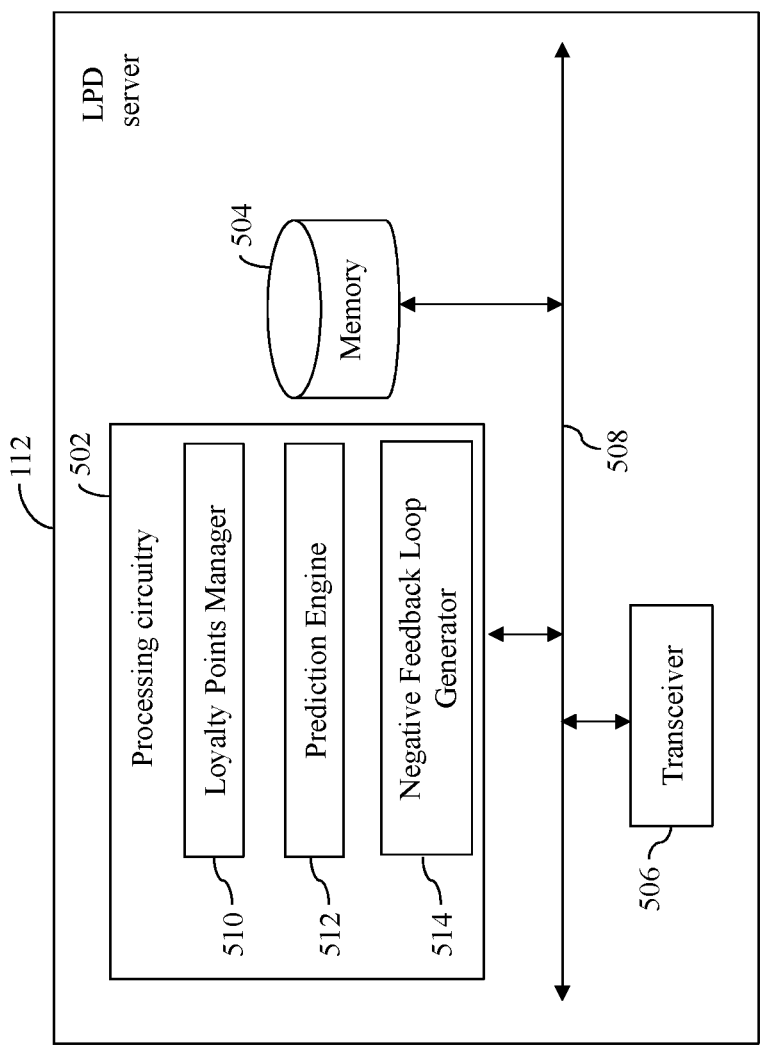
FIG. 5 is a block diagram that illustrates a loyalty points disbursement (LPD) server of FIG. 1, in accordance with an exemplary embodiment of the disclosure.

FIG. 5 is a block diagram that illustrates the LPD server 112, in accordance with an exemplary embodiment of the disclosure. The LPD server 112 may include a processing circuitry 502, a memory 504, and a transceiver 506. The processing circuitry 502, the memory 504, and the transceiver 506 may communicate with each other by way of a communication bus 508. The processing circuitry 502 may include a loyalty points manager 510, a prediction engine 512, and a negative feedback loop (NFL) generator 514.

The processing circuitry 502 includes suitable logic, circuitry, interfaces, and/or code, executed by the circuitry, to disburse loyalty points to the set of users 102. The processing circuitry 502 may be further configured to host the service application that is executable on the first through third user devices 104a-104c. Examples of the processing circuitry 502 may include, but are not limited to, an application-specific integrated circuit (ASIC) processor, a reduced instruction set computer (RISC) processor, a complex instruction set computer (CISC) processor, a field programmable gate array (FPGA), and the like. The processing circuitry 502 may execute various operations for disbursing loyalty points by way of the loyalty points manager 510, the prediction engine 512, and the NFL generator 514.

The loyalty points manager 510 may be configured to control disbursement of the first set of loyalty points as per the LPD parameters. The loyalty points manager 510 may be further configured to dynamically update the earn rate based on at least one of the real-time transaction data, the predictive transaction data, the real-time market disbursement data, and the predictive market disbursement data. Further, the loyalty points manager 510 may be configured to update at least one of the first through fourth weights of the real-time transaction data, the predictive transaction data, the real-time market disbursement data, and the predictive market disbursement data, respectively, for updating the earn rate. Further, the loyalty points manager 510 may be configured to disburse the first set of loyalty points based on at least the updated earn rate for a transaction performed by a user such as the first, second, or third user 102a, 102b, or 102c. Thus, the loyalty points manager 510 prevents an overspend or an underspend of the loyalty points budget.

The prediction engine 512 may be configured to predict a likelihood of earning the first set of loyalty points with the highest earn rate by the user for the batch of transactions performed in the first time interval. The prediction engine 512 may be further configured to communicate a request notification to a corresponding user device of the user. When the user communicates a dissent for earning the first set of loyalty points with the highest earn rate, the prediction engine 512 may disburse the first set of loyalty points with a real-time earn rate (i.e., based on an earn rate at a time of performing the transaction). However, the prediction engine 512 may disburse the first set of loyalty points based on the highest earn rate applicable during the first time interval, after the elapse of the first time interval, when the user communicates a consent.

The NFL generator 514 may be configured to identify the first and second subsets of users and disburse additional loyalty points to the first subset of users, when the previous loyalty points earned by the first subset of users is less than the threshold loyalty point and the previous loyalty points earned by the second subset of users is more than the threshold loyalty point. For disbursing the additional loyalty points to the first subset of users, the NFL generator 514 may offset a global earn rate with the first value (i.e., increases the earn rate) for the first subset of users for a subsequent transaction. Further, to maintain the global earn rate, the NFL generator 514 may be configured to offset the global earn rate with the second value (i.e., decreases the earn rate) for the second subset of users for a subsequent transaction.

The memory 504 includes suitable logic, circuitry, interfaces, and/or code, executable by the circuitry, to store user details of the each user, loyalty points earned by each user, a record of previous transactions performed by each user and the corresponding earn rates, and the like). Various information may be stored in an encrypted format to ensure data security and integrity. Examples of the memory 504 may include a random-access memory (RAM), a read-only memory (ROM), a removable storage drive, a hard disk drive (HDD), a flash memory, a solid-state memory, and the like. It will be apparent to a person skilled in the art that the scope of the disclosure is not limited to realizing the memory 504 in the LPD server 112, as described herein. In another embodiment, the memory 504 may be realized in form of a database server (not shown) or a cloud storage (not shown) working in conjunction with the LPD server 112, without departing from the scope of the disclosure.

The transceiver 506 may include suitable logic, circuitry, interfaces, and/or code, executable by the circuitry, to transmit and receive data over the communication network 114 using one or more communication network protocols. The transceiver 506 may transmit various requests and messages to the first through third user devices 104a-104c, the issuer and merchant servers 106 and 108, and the payment network server 110. The transceiver 506 may further receive various requests and messages from the first through third user devices 104a-104c, the issuer and merchant servers 106 and 108, and the payment network server 110. Examples of the transceiver 506 may include, but are not limited to, an antenna, a radio frequency transceiver, a wireless transceiver, a Bluetooth transceiver, an ethernet port, a universal serial bus (USB) port, or any other device configured to transmit and receive data.

Figure 6A:
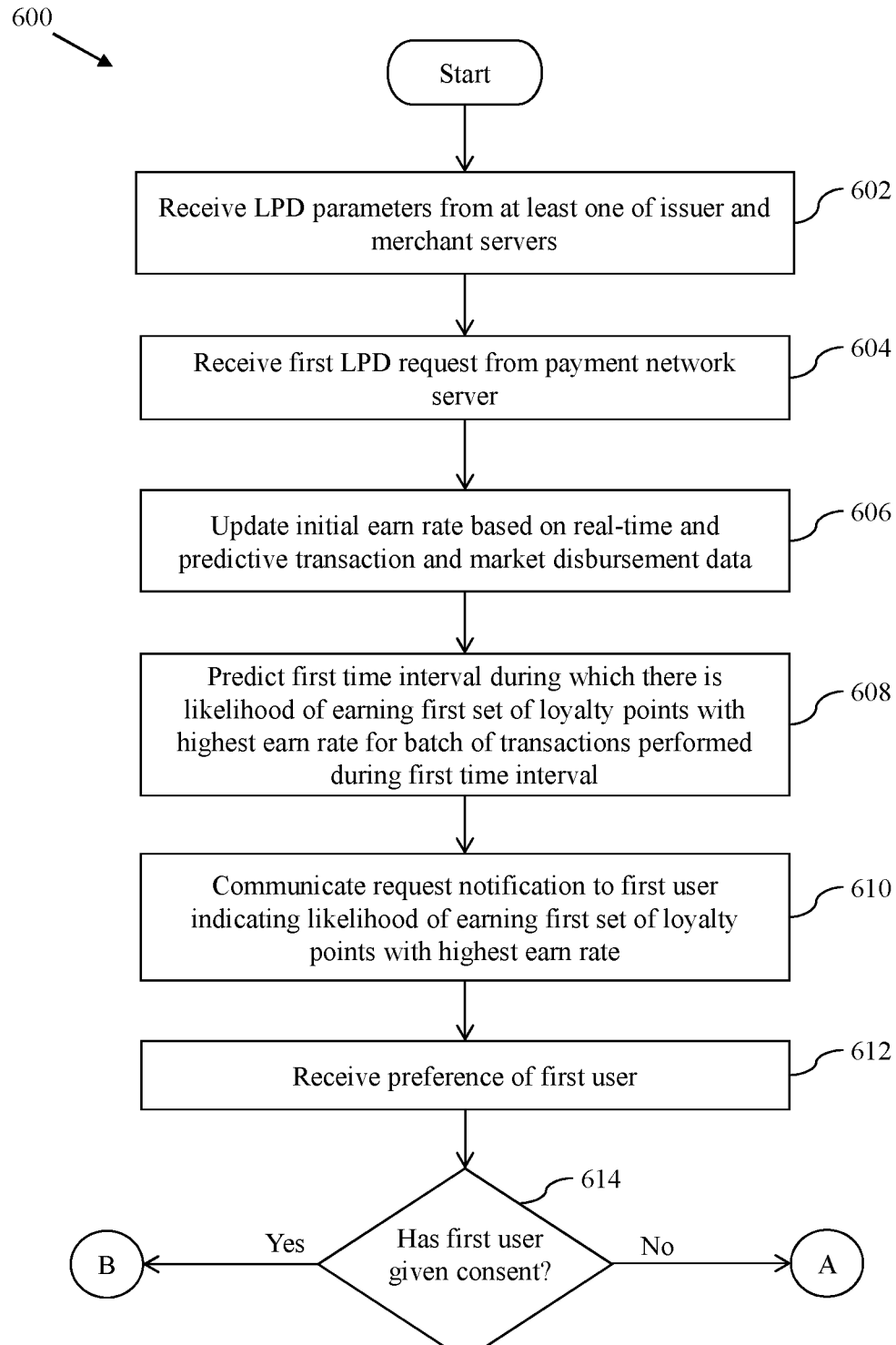
FIGS. 6A and 6B, collectively, represent a flow chart that illustrates a method for disbursing loyalty points, in accordance with an exemplary embodiment of the disclosure.
Figure 6B:
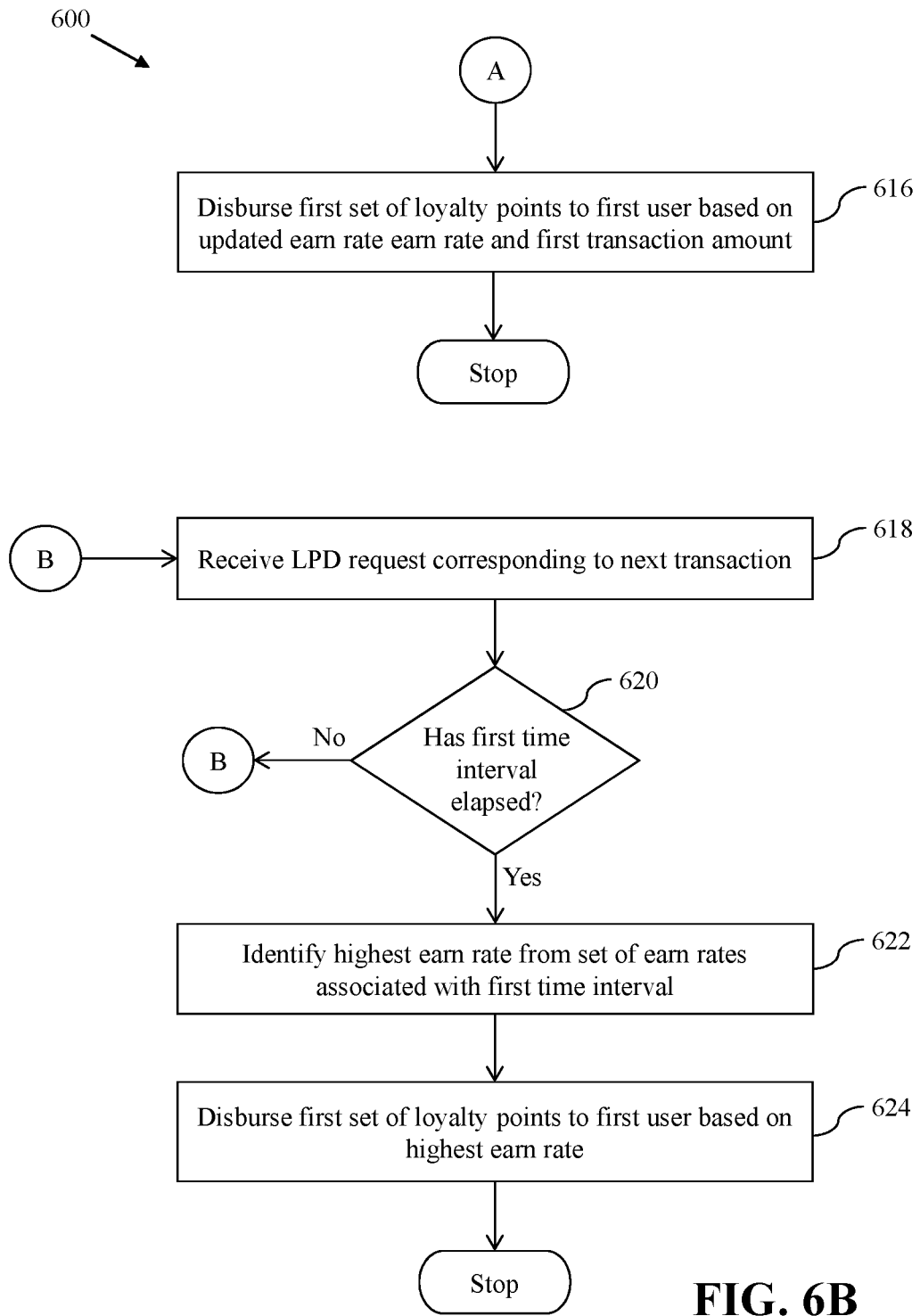

FIGS. 6A and 6B, collectively, represent a flow chart 600 that illustrates a method for disbursing loyalty points, in accordance with an exemplary embodiment of the disclosure. For the sake of ongoing discussion, the flow chart 600 is described with respect to the first user 102a, however, it will be understood by a person skilled in the art that loyalty points are disbursed to other users in a similar manner.

At step 602, the LPD server 112 receives LPD parameters from at least one of the issuer and merchant servers 106 and 108. The LPD parameters include an initial earn rate, a loyalty points budget, and a disbursement period. At step 604, the LPD server 112 receives a first LPD request from the payment network server 110 for disbursing a first set of loyalty points corresponding to a first transaction performed by the first user 102a. For the sake of ongoing discussion, it is assumed that a current earn rate at a time when the first LPD request is received is equal to a first earn rate, and a transaction amount of the first transaction is equal to a first transaction amount. At step 606, the LPD server 112 updates the initial earn rate (for example, a previous earn rate) based on at least one of real-time transaction data, predictive transaction data, real-time market disbursement data, and predictive market disbursement data. Thus, the current earn rate or the first earn rate is obtained based on the update of the initial earn rate by the LPD server 112. At step 608, the LPD server 112 predicts a first time interval during which there is a likelihood of earning the first set of loyalty points with a highest earn rate for a batch of transactions performed during the first time interval. At step 610, the LPD server 112 communicates a request notification to the first user 102a. The request notification indicates the likelihood of earning the first set of loyalty points with the highest earn rate.

At step 612, the LPD server 112 receives a preference of the first user 102a for earning the first set of loyalty points with the highest earn rate. The preference is communicated by the first user 102a by way of the service application running on the first user device 104a. At step 614, the LPD server 112 determines whether the preference indicates a consent or a dissent of the first user 102a. If at step 614, it is determined that the preference indicates the dissent of the first user 102a, step 616 is performed. At step 616, the LPD server 112 disburses the first set of loyalty points to the first user 102a based on the first earn rate and the first transaction amount. If at step 614, it is determined that the preference indicates the consent of the first user 102a, step 618 is performed. At step 618, the LPD server 112 receives a next LPD request corresponding to a next transaction performed by the first user 102a during the first time interval. At step 620, the LPD server 112 determines whether the first time interval has elapsed. If at step 620, it is determined that the first time interval has not elapsed, step 618 is performed. It will be understood by a person skilled in the art that step 618 will be performed repeatedly till the first time interval has elapsed (i.e., the LPD server 112 keeps on receiving a next LPD request corresponding to each next transaction performed by the first user 102a during the first time interval).

If at step 620, it is determined that the first time interval has elapsed, step 622 is performed. At step 622, the LPD server 112 identifies the highest earn rate from a set of earn rates associated with the first time interval. The set of earn rates may correspond to a set of transactions including the first transaction performed by the first user 102a during the first time interval. At step 624, the LPD server 112 disburses the first set of loyalty points to the first user 102a based on the identified highest earn rate and a transaction amount corresponding to each of the set of transactions.

Figure 7:
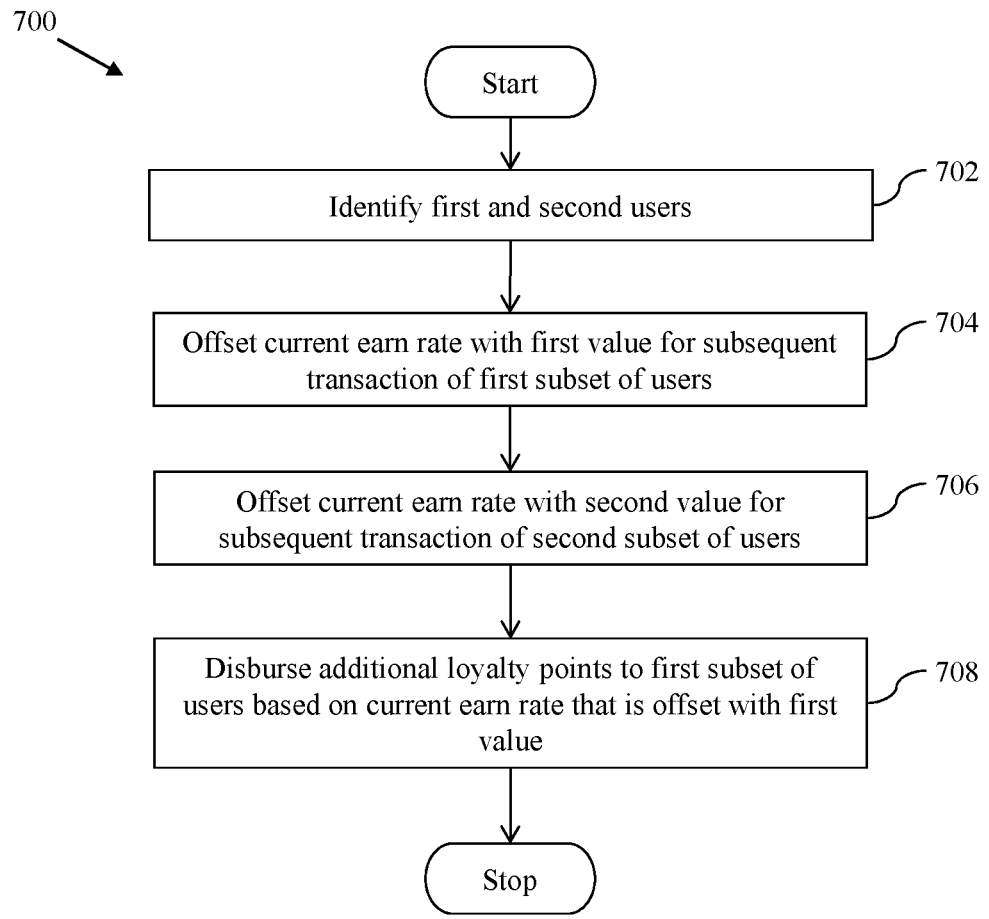
FIG. 7 represents a flow chart that illustrates a method for disbursing additional loyalty points to a first subset of users of the set of users of FIG. 1, in accordance with an exemplary embodiment of the disclosure.

FIG. 7 represents a flow chart 700 that illustrates a method for disbursing additional loyalty points to the first subset of users of the set of users 102, in accordance with an exemplary embodiment of the disclosure. At step 702, the LPD server 112 identifies the first and second subsets of users. The first and second subsets of users may be identified based on previous earn rate or previous loyalty points corresponding previous transactions performed by the first and second subsets of users. For example, when the previous loyalty points associated with each previous transaction of one or more previous transactions is less than the threshold loyalty point, the first subset of users (such as the first user 102a) may be identified from the set of users 102. Similarly, when the previous loyalty points associated with each previous transaction of one or more previous transactions is more than the threshold loyalty point, the second subset of users (such as the second user 102b or the third user 102c) may be identified from the set of users 102. At step 704, the LPD server 112 offsets a current earn rate with the first value (i.e., increases the current earn rate) for a subsequent transaction performed by each of the first subset of users. At step 706, the LPD server 112 offsets a current earn rate with the second value (i.e., decreases the current earn rate) for a subsequent transaction performed by each of the second subset of users. Thus, the LPD server 112, when the previous loyalty points for each previous transaction associated with each of the first subset of users is less than the threshold loyalty point, updates the initial earn rate based on one or more previous earn rates associated with the one or more previous transactions performed by the second subset of users, wherein each previous earn rate of the one or more previous earn rates is greater than a threshold earn rate. At step 708, the LPD server 112 disburses the first set of loyalty points (for example, the additional loyalty points) to the first subset of users based on the current earn rate that is offset with the first value.

Figure 8:
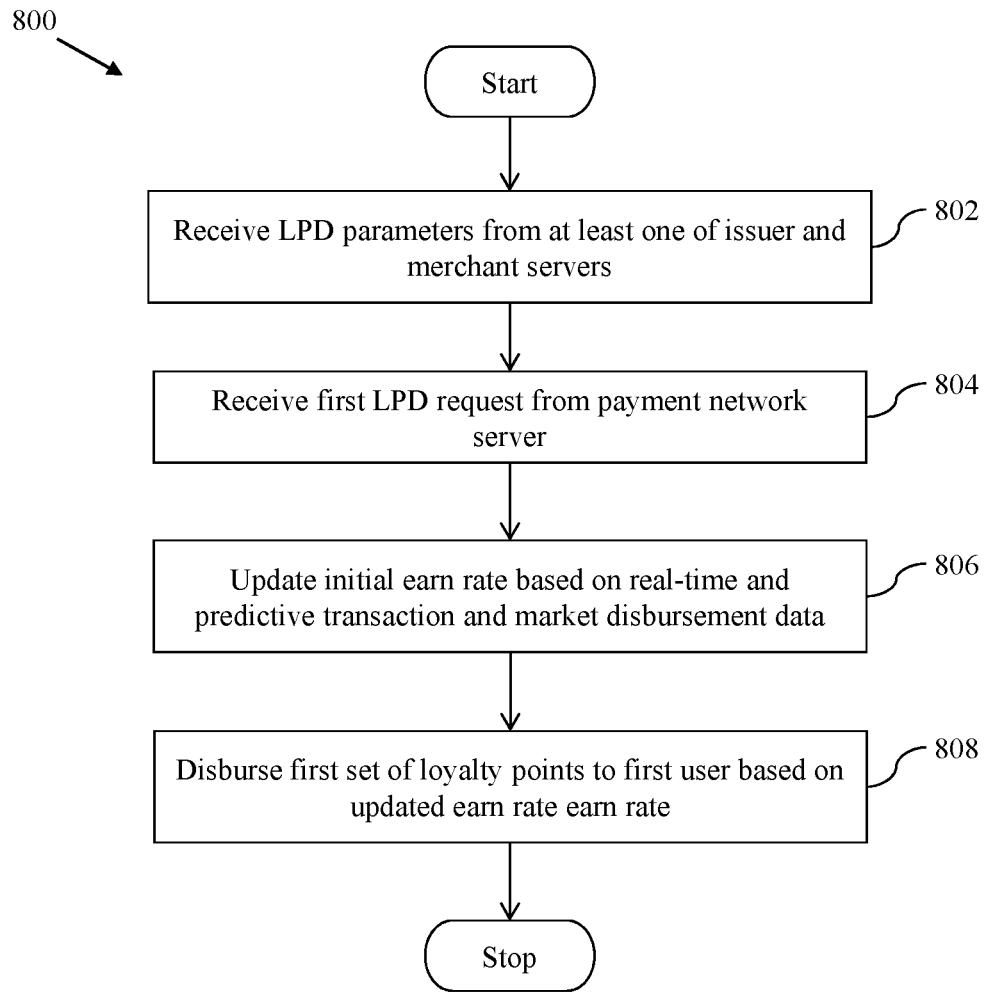
FIG. 8 represents a high-level flow chart that illustrates a method for disbursing loyalty points, in accordance with an exemplary embodiment of the disclosure.

FIG. 8 represents a high-level flow chart 800 that illustrates a method for disbursing loyalty points, in accordance with an exemplary embodiment of the disclosure. At step 802, the LPD server 112 receives LPD parameters from at least one of the issuer and merchant servers 106 and 108. The LPD parameters include the initial earn rate, the loyalty points budget, and the disbursement period. At step 804, the LPD server 112 receives a first LPD request from the payment network server 110. At step 806, the LPD server 112 updates the initial earn rate based on at least one of the real-time transaction data, the predictive transaction data, the real-time market disbursement data, and the predictive market disbursement data. At step 808, the LPD server 112 disburses the first set of loyalty points to the first user 102a based on at least the updated earn rate and a first transaction amount corresponding to the first transaction.

Figure 9:
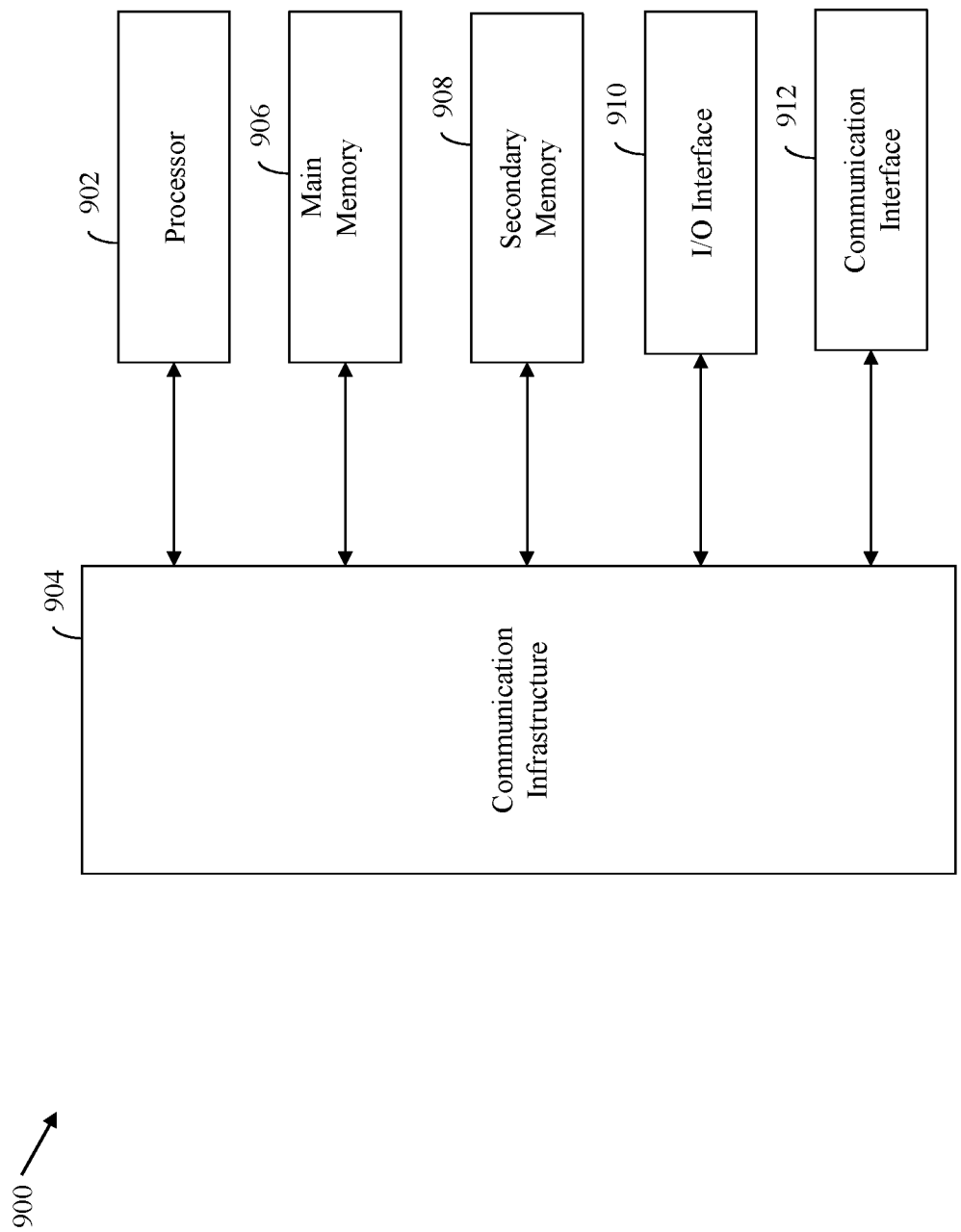
FIG. 9 is a block diagram that illustrates a system architecture of a computer system, in accordance with an exemplary embodiment of the disclosure.

FIG. 9 is a block diagram that illustrates a system architecture of a computer system 900, in accordance with an exemplary embodiment of the disclosure. An exemplary embodiment of the disclosure, or portions thereof, may be implemented as computer readable code on the computer system 900. In one example, the first through third user devices 104a-104c, the issuer server 106, the merchant server 108, the payment network server 110, and the LPD server 112 of FIG. 1 may be implemented in the computer system 900 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 6A-6B, 7, and 8.

The computer system 900 includes a processor 902 that may be a special-purpose or a general-purpose processing device. The processor 902 may be a single processor, multiple processors, or combinations thereof. The processor 902 may have one or more processor cores. In one example, the processor 902 is an octa-core processor. The processor 902 may be connected to a communication infrastructure 904, such as a bus, message queue, multi-core message-passing scheme, and the like. The computer system 900 may further include a main memory 906 and a secondary memory 908. Examples of the main memory 906 may include RAM, ROM, and the like. The secondary memory 908 may include a hard disk drive or a removable storage drive, such as a floppy disk drive, a magnetic tape drive, a compact disc, an optical disk drive, a flash memory, and the like. The removable storage drive may read from and/or write to a removable storage device in a manner known in the art. In one example, if the removable storage drive is a compact disc drive, the removable storage device may be a compact disc. In an embodiment, the removable storage unit may be a non-transitory computer readable recording media.

The computer system 900 further includes an input/output (I/O) interface 910 and a communication interface 912. The I/O interface 910 includes various input and output devices that are configured to communicate with the processor 902. Examples of the input devices may include a keyboard, a mouse, a joystick, a touchscreen, a microphone, and the like. Examples of the output devices may include a display screen, a speaker, headphones, and the like. The communication interface 912 may be configured to allow data to be transferred between the computer system 900 and various devices that are communicatively coupled to the computer system 900. Examples of the communication interface 912 may include a modem, a network interface, i.e., an Ethernet card, a communication port, and the like. Data transferred via the communication interface 912 may correspond to signals, such as electronic, electromagnetic, optical, or other signals as will be apparent to a person skilled in the art. The signals may travel via a communication channel (not shown) which may be configured to transmit the signals to devices that are communicatively coupled to the computer system 900. Examples of the communication channel may include, but are not limited to, cable, fiber optics, a phone line, a cellular phone link, a radio frequency link, and the like.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into digitally any device. For instance, at least one processor such as the processor 902 and a memory such as the main memory 906 and the secondary memory 908 implements the above described embodiments. Further, the operations may be described as a sequential process, however, some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Thus, the LPD server 112 offers an efficient method for disbursing loyalty points from the loyalty points budget. As the LPD server 112 dynamically updates the initial earn rate based on at least one of the real-time and predictive transaction data and the real-time and predictive market disbursement data, it is ensured that the loyalty points budget is efficiently utilized (i.e., both overspending and underspending of the loyalty points budget are prevented). This is advantageous for the first issuer and the first merchant (or any other entity that purchases a loyalty program) since the LPD server 112 ensures that no financial loss is incurred (by preventing the overspending of the loyalty points budget) and the set of users 102 is actively involved in the purchase of one or more products or services offered by at least one of the first issuer and the first merchant (by preventing the underspending of the loyalty points budget). Further, the LPD server 112 ensures fair disbursement of the loyalty points to each user by implementing a negative feedback loop. Due to the negative feedback loop, a likelihood of earning higher loyalty points by each of the first subset of users for a subsequent transaction is greatly increased. Furthermore, to increase enthusiasm of the set of users 102 for performing more transactions, the LPD server 112 offers disbursement of the first set of loyalty with the highest earn rate for a batch of transactions performed within a time interval during which there is a likelihood of an earn rate being highest.

Although various embodiments of the disclosure are described with respect to the LPD server 112, the disclosure is not limited to it. It will be understood by a person skilled in the art that such embodiments may be realized with the issuer server 106, the merchant server 108, the payment network server 110, or any other server in a similar manner.

Techniques consistent with the disclosure provide, among other features, systems and methods for disbursing loyalty points. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

In the claims, the words 'comprising', 'including' and 'having' do not exclude the presence of other elements or steps than those listed in a claim. The terms "a" or "an," as used herein, are defined as one or more than one. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method for disbursing loyalty points, the method comprising:
   receiving, by a loyalty points disbursement (LPD) server from at least one of an issuer server and a merchant server, LPD parameters including at least an initial earn rate, a loyalty points budget, and a disbursement period, the issuer server being a first computing device operated by a financial institution that manages payment accounts of multiple users and the merchant server being a second computing device operated by a merchant;
   receiving, by the LPD server from a payment network server, a first LPD request corresponding to a first transaction performed by a first user;
   updating, by the LPD server, the initial earn rate based on at least one of real-time transaction data, predictive transaction data, real-time market disbursement data, and predictive market disbursement data, wherein
      the real-time transaction data includes real-time available budget data and real-time available disbursement period,
      the predictive transaction data includes an estimate of future transactions in one or more future time intervals,
      the real-time market disbursement data includes a real-time disbursement rate at which loyalty points are currently being disbursed by other issuers or merchants, and
      the predictive market disbursement data includes a future disbursement rate at which loyalty points are likely to be disbursed by other issuers or merchants; and
   disbursing, by the LPD server, a first set of loyalty points, from the loyalty points budget, to the first user based on the updated earn rate and a transaction amount of the first transaction.

2. The method of claim 1, further comprising communicating, by the LPD server, upon receipt of the first LPD request, a request notification to the first user, wherein
   the request notification indicates a likelihood of earning a highest earn rate after elapse of a first time interval for a batch of transactions performed by the first user during the first time interval, and
   the batch of transactions includes at least one other transaction in addition to the first transaction.

3. The method of claim 2, further comprising receiving, by the LPD server, in response to the communication of the request notification, a preference of the first user for earning the first set of loyalty points, wherein,
   when the preference indicates a dissent of the first user, the first set of loyalty points corresponding to the first transaction is disbursed to the first user based on at least the updated earn rate and the transaction amount of the first transaction after the first transaction is performed by the first user, and
   when the preference indicates a consent of the first user, the first set of loyalty points corresponding to the batch of transactions is disbursed to the first user based on at least the updated earn rate which is the highest earn rate in the first time interval and the transaction amount of each transaction of the batch of transactions.

4. The method of claim 2, further comprising identifying, by the LPD server, after the elapse of the first time interval, the highest earn rate from a set of earn rates applicable during the first time interval, wherein the highest earn rate is the updated earn rate.

5. The method of claim 1, wherein a likelihood of earning the first set of loyalty points by the first user for the first transaction is higher in comparison to one or more previous transactions performed by the first user, when previous loyalty points associated with each previous transaction of the one or more previous transactions is less than a threshold loyalty point.

6. The method of claim 5, further comprising updating, by the LPD server, when the previous loyalty points for each previous transaction is less than the threshold loyalty point, the initial earn rate based on one or more previous earn rates associated with one or more previous transactions performed by one or more other users, wherein each previous earn rate of the one or more previous earn rates is greater than a threshold earn rate.

7. The method of claim 1, further comprising assigning, by the LPD server, a weight to each of the real-time transaction data, the predictive transaction data, the real-time market disbursement data, and the predictive market disbursement data for updating the initial earn rate.

8. A system for disbursing loyalty points, the system comprising:
   an issuer server, the issuer server being a first computing device operated by a financial institution that manages payment accounts of multiple users;
   a merchant server, the merchant server being a second computing device operated by a merchant; and
   a loyalty points disbursement (LPD) server comprising:
      a memory; and
      a processor including at least circuitry and logic to execute instructions stored in the memory, the processor configured to:
         receive, from at least one of an issuer server and a merchant server, LPD parameters including at least an initial earn rate, a loyalty points budget, and a disbursement period;
         receive, from a payment network server, a first LPD request corresponding to a first transaction performed by a first user;
         update the initial earn rate based on at least one of real-time transaction data, predictive transaction data, real-time market disbursement data, and predictive market disbursement data, wherein
the real-time transaction data includes real-time available budget data and real-time available disbursement period,
the predictive transaction data includes an estimate of future transactions in one or more future time intervals,
the real-time market disbursement data includes a real-time disbursement rate at which loyalty points are currently being disbursed by other issuers or merchants, and
the predictive market disbursement data includes a future disbursement rate at which loyalty points are likely to be disbursed by other issuers or merchants; and disburse a first set of loyalty points, from the loyalty points budget, to the first user based on the updated earn rate and a transaction amount of the first transaction.

9. The system of claim 8, wherein the LPD server is further configured to communicate, upon receipt of the first LPD request, a request notification to the first user, wherein
the request notification indicates a likelihood of earning a highest earn rate after elapse of a first time interval for a batch of transactions performed by the first user during the first time interval, and
the batch of transactions includes at least one other transaction in addition to the first transaction.

10. The system of claim 9, wherein the LPD server is further configured to receive, in response to the communication of the request notification, a preference of the first user for earning the first set of loyalty points, wherein,
when the preference indicates a dissent of the first user, the first set of loyalty points corresponding to the first transaction is disbursed to the first user based on at least the updated earn rate and the transaction amount of the first transaction after the first transaction is performed by the first user, and
when the preference indicates a consent of the first user, the first set of loyalty points corresponding to the batch of transactions is disbursed to the first user based on at least the updated earn rate which is the highest earn rate in the first time interval and the transaction amount of each transaction of the batch of transactions.

11. The system of claim 9, wherein the LPD server is further configured to identify, after the elapse of the first time interval, the highest earn rate from a set of earn rates applicable during the first time interval, wherein the highest earn rate is the updated earn rate.

12. The system of claim 8, wherein a likelihood of earning the first set of loyalty points by the first user for the first transaction is higher in comparison to one or more previous transactions performed by the first user, when previous loyalty points associated with each previous transaction of the one or more previous transactions is less than a threshold loyalty point.

13. The system of claim 12, wherein the LPD server is further configured to update, when the previous loyalty points for each previous transaction is less than the threshold loyalty point, the initial earn rate based on one or more previous earn rates associated with one or more previous transactions performed by one or more other users, wherein each previous earn rate of the one or more previous earn rates is greater than a threshold earn rate.

14. The system of claim 8, wherein the LPD server is further configured to assign a weight to each of the real-time transaction data, the predictive transaction data, the real-time market disbursement data, and the predictive market disbursement data to update the initial earn rate.

\* \* \* \* \*